United States Patent
Rom et al.

(10) Patent No.: US 9,526,993 B2
(45) Date of Patent: Dec. 27, 2016

(54) SYSTEMS AND METHODS FOR ASSOCIATING PLAYERS OF ELECTRONIC GAMES

(71) Applicant: STEELSERIES ApS, Valby (DK)

(72) Inventors: Kim Rom, Chicago, IL (US); Jeffrey Nicholas Mahlmeister, Chicago, IL (US); Jacob Wolff-Petersen, Richmond (GB); Bruce Hawver, Hawthorn Woods, IL (US); Francis Arnold Grever, Palatine, IL (US); Tino Soelberg, Copenhagen (DK); Christopher John Nicolella, Elk Grove Village, IL (US)

(73) Assignee: STEELSERIES ApS, Frederiksberg (DK)

( * ) Notice: Subject to any disclaimer, the term of this patent is extended or adjusted under 35 U.S.C. 154(b) by 135 days.

(21) Appl. No.: 13/958,113

(22) Filed: Aug. 2, 2013

(65) Prior Publication Data
US 2015/0038233 A1    Feb. 5, 2015

(51) Int. Cl.
*A63F 13/30*     (2014.01)
*A63F 13/795*    (2014.01)
*A63F 13/42*     (2014.01)

(52) U.S. Cl.
CPC ............. *A63F 13/795* (2014.09); *A63F 13/42* (2014.09)

(58) Field of Classification Search
None
See application file for complete search history.

(56) References Cited

U.S. PATENT DOCUMENTS

| | | | |
|---|---|---|---|
| 7,614,955 B2 | 11/2009 | Farnham | |
| 7,677,970 B2 | 3/2010 | O'Kelley | |
| 8,998,723 B2 * | 4/2015 | Buhr | A63F 13/12 463/29 |
| 2004/0053690 A1 * | 3/2004 | Fogel | A63F 13/12 463/31 |
| 2004/0097287 A1 * | 5/2004 | Postrel | 463/41 |
| 2005/0192097 A1 * | 9/2005 | Farnham | A63F 13/12 463/42 |
| 2005/0245317 A1 * | 11/2005 | Arthur | A63F 13/12 463/42 |
| 2006/0121973 A1 * | 6/2006 | Parisien | G07F 17/32 463/16 |
| 2007/0149290 A1 * | 6/2007 | Nickell | A63F 13/12 463/42 |
| 2008/0242420 A1 | 10/2008 | Graepel | |

(Continued)

*Primary Examiner* — Jason Skaarup
(74) *Attorney, Agent, or Firm* — Guntin & Gust, PLC; Ed Guntin

(57) ABSTRACT

A system, processor or computer readable device that incorporates teachings of the present disclosure may include, for example, receiving a user attribute of a first user based on a record of stimulation of an electronic gaming accessory of the first user. The record of stimulation is determined responsive to game-related activity in an electronic game application. A first user record is updated responsive to the receiving of the user attribute of the first user, resulting in an updated first user record. The updated first user record is forwarded to a matching service, wherein the matching service matches the first user and a second user based on the updated first user record. Such matching can be used to associate players of electronic games, for example, as members of a team. Additional embodiments are disclosed.

20 Claims, 13 Drawing Sheets

(56) References Cited

U.S. PATENT DOCUMENTS

| | | | |
|---|---|---|---|
| 2010/0173712 A1* | 7/2010 | Buhr | A63F 31/795 |
| | | | 463/42 |
| 2010/0255916 A1* | 10/2010 | Sioufi Filho | A63F 13/12 |
| | | | 463/42 |
| 2012/0142429 A1* | 6/2012 | Muller | A63F 13/12 |
| | | | 463/42 |
| 2012/0143779 A1 | 6/2012 | Chang | |
| 2012/0289341 A1* | 11/2012 | Moshal | 463/42 |
| 2012/0302332 A1 | 11/2012 | Buhr | |
| 2013/0143669 A1* | 6/2013 | Muller | 463/42 |
| 2014/0162781 A1* | 6/2014 | Butler | A63F 13/795 |
| | | | 463/31 |

* cited by examiner

600

700

900

SYSTEMS AND METHODS FOR ASSOCIATING PLAYERS OF ELECTRONIC GAMES

FIELD OF THE DISCLOSURE

The present disclosure relates generally to systems and methods for associating players of electronic games.

BACKGROUND

It is common today for game players, or gamers, to participate in competitive play of video games, sometimes referred to as professional gaming, e-sport, and cybersport. Games are played competitively at amateur, semi-professional and professional levels, with some games having organized competitions in the form of leagues and tournaments. Some common video game genres associated with competitive play of video games include real-time strategy, fighting, first-person shooter, massively-multiplayer online, racing and multiplayer online battle arena Some gaming services can provide multiplayer online services, such as chatting and game listings. It is not uncommon for such gaming services to have large numbers, e.g., tens or even hundreds of thousands of players logged on at any given time. Some gaming services can be incorporated into the electronic games that make use of them. Others can be provided through external interfaces used by other online services. Some examples of online gaming services include Xbox Live, Battle.net, Half-Life TV (hlt-v.org), Electronic Sports League—Europe (ESL.eu), and quakelive.com.

At least some of these services include a matchmaking concept, sometimes referred to as arranged teams. In an arranged team game, such as Battle.net's Warcraft III, a player can form a team with one or more other players. The team, once formed, can be anonymously matched up with another team of similar size and rank. Matchmaking techniques can use a ranking algorithm, such as a Bayesian ranking algorithm developed by Microsoft Research and used in the Xbox® matchmaking system. Other systems rely on a player's rating dependent upon an outcome of games, e.g., wins and/or losses, between rated players.

BRIEF DESCRIPTION OF THE DRAWINGS

Reference will now be made to the accompanying drawings, which are not necessarily drawn to scale, and wherein.

DETAILED DESCRIPTION

Figure 1:
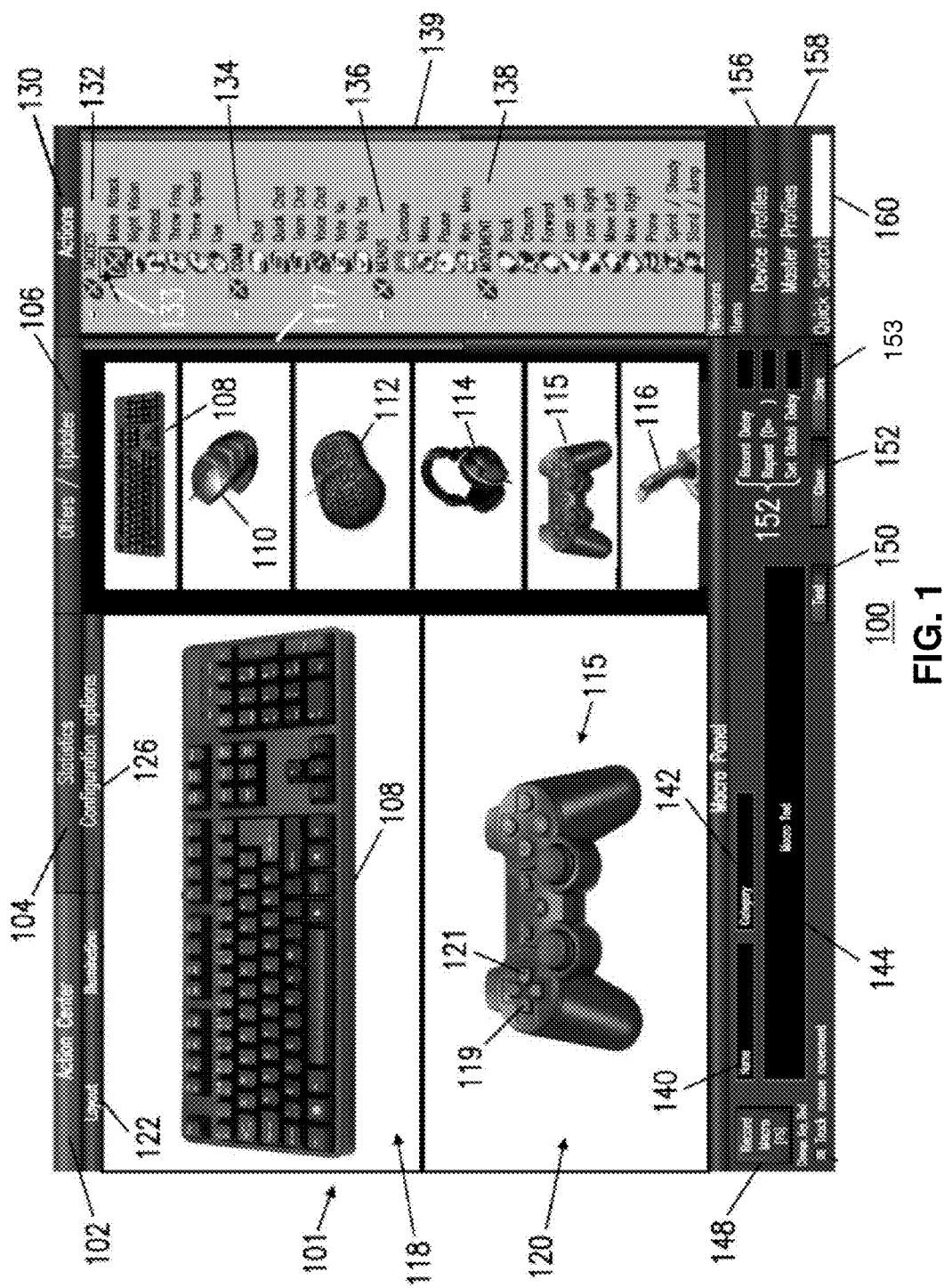
FIG. 1 depicts an illustrative embodiment of a Graphical User Interface (GUI) generated by an Accessory Management Software (AMS) application according to the present disclosure.

The subject disclosure describes, among other things, illustrative embodiments for collecting, processing, cataloguing and presenting performances of gamers based on stimulus signal generated by accessory devices. Also disclosed are embodiments for facilitating social networking based on gamer proficiency in manipulating various features of a game controller. By way of example, such features of a game controller may relate to manipulation of a "fire" button in a shooting game, a strum button in a rhythm game, or a dance pedal in an exercise game. For example, a gamer's skill or proficiency can be based at least in part on a number of times a button is pressed, a rate at which the button is pressed, whether the correct button was pressed and so forth, according to a situational context of a game.

Such game-related social network can be distinguished from typical social networking in that such social networks are based on game control stimulus signals rather than the results of such stimulus signals, such as game results alone. Such stimulus signals are typically provided to a game console or processor causing a result to occur within the course of progression of the game. Other embodiments are contemplated by the subject disclosure.

One embodiment of the present disclosure can entail a process including receiving, by a system comprising a processor, a respective user attribute for each of a number of users, wherein the respective user attribute is based on a stimulation record of an electronic game control actuator of a corresponding user of the number of users. A team profile is determined, by the system, including a number of team-member profiles. Each team-member profile includes a respective team-member profile attribute. The team-member profile attribute of a select team-member profile is determined by the system. The respective user attribute for each of the multiple users and the team-member profile attribute of the select team-member profile are correlated by the system. A select user of the multiple users is matched, by the system, with the select team-member profile of the multiple team-member profiles based on the correlating of the respective user attribute for each of the multiple users with the team-member profile attribute of the select team-member profile.

Another embodiment of the present disclosure can entail a device including a memory to store computer instructions and a processor in communication with the memory. The processor, responsive to executing the computer instructions, performs operations including receiving a respective user attribute for each of a number of users, wherein the respective user attribute is based on a stimulation record of an electronic gaming accessory of a corresponding user of the number of users. A target profile is determined comprising a target attribute. The respective user attribute for each of the number of users and the target attribute of the target profile are correlated. A select user of the number of users is matched to the target profile based on the correlation.

Yet another embodiment of the present disclosure can entail a computer-readable storage device including computer instructions, which responsive to being executed by a processor, cause the processor to perform operations including receiving a user attribute of a first user based on a record of stimulation of an electronic gaming accessory of the first user. The receiving of the user attribute is responsive to game-related activity in an electronic game application. A first user record is updated responsive to the receiving of the user attribute of the first user, resulting in an updated first user record. The updated first user record is forwarded to a matching service, wherein the matching service matches the first user and a second user based on the updated first user record.

FIG. 1 depicts an illustrative embodiment of a Graphical User Interface (GUI) 100 generated by an Accessory Management Software (AMS) application according to the present disclosure. The AMS application can be executed by a computing device such as a desktop computer, a laptop computer, a server, a mainframe computer, a gaming console, a gaming accessory, or combinations or portions thereof. The AMS application can also be executed by portable computing devices (with computing resources) such as a cellular phone, a personal digital assistant, a tablet (such as an iPAD™), or a media player (such as an iPOD™). It is contemplated that the AMS application can be executed by any device with suitable computing resources to perform the embodiments described herein.

Figure 2:
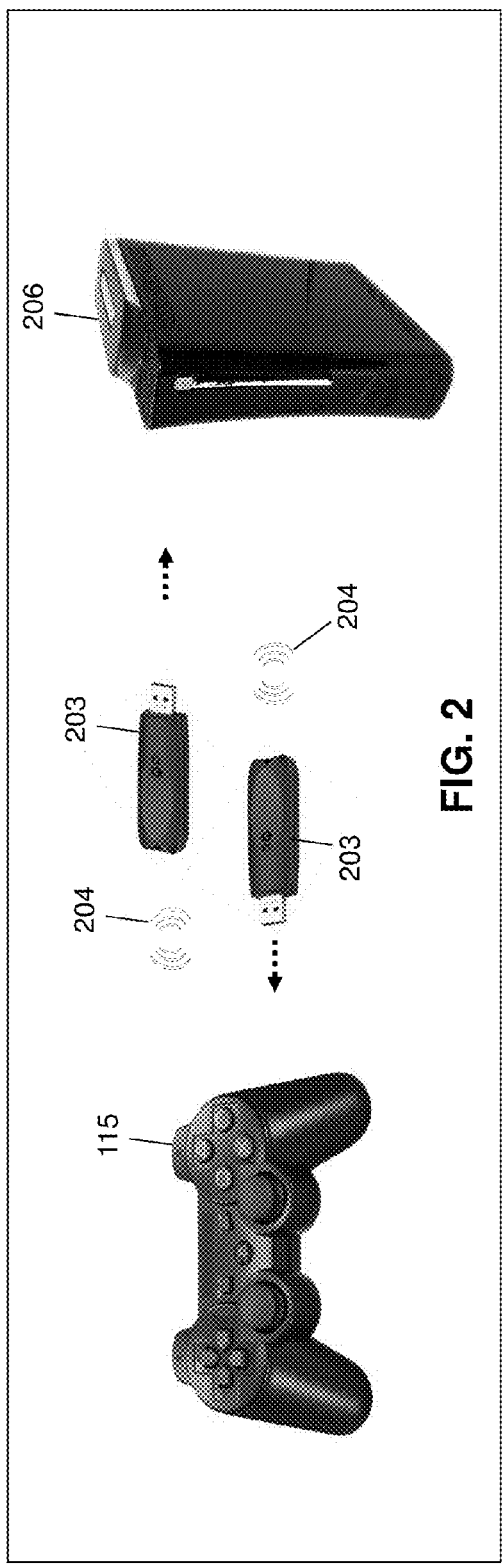
FIGS. 2-3 depict illustrative embodiments for communicatively coupling a gaming controller to a computing device.

FIG. 2 illustrates a number of embodiments for utilizing a wireless dongle 203 with gaming controller 115 or a gaming console (herein referred to as gaming console 206). In the illustration of FIG. 2, the USB portion of the dongle 203 can be physically engaged with the gaming controller 115 or the gaming console 206. The dongle 203 in either of these configurations can facilitate wireless communications 204 between the gaming controller 115 and the gaming console 206 (e.g., WiFi, Bluetooth, ZigBee, or proprietary protocol). It is contemplated that functions of the dongle 203 can in whole or in part be an integral part of the gaming controller 115 or the gaming console 206. It is also contemplated that the AMS application can in whole or in part be executed by computing resources of the dongle 203.

Figure 3:
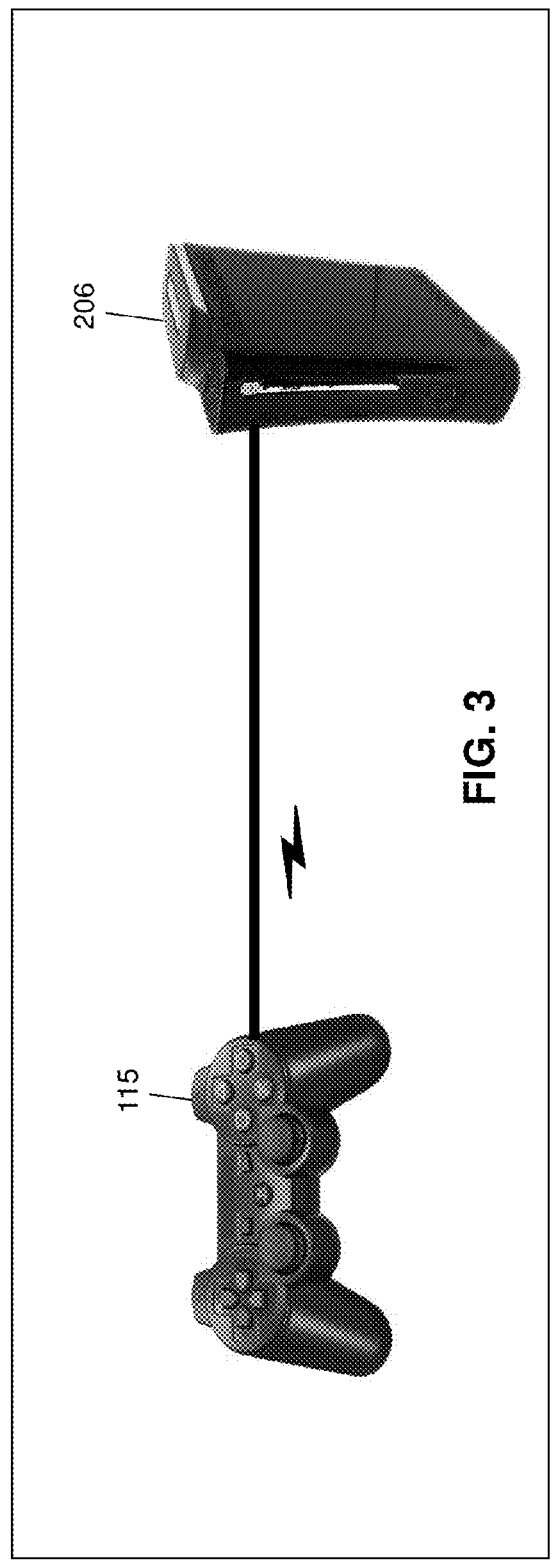

In one embodiment, the gaming controller 115 can be tethered to a computing device such as the gaming console 206 by a cable (e.g., USB cable) as shown in FIG. 3 to provide a means of communication less susceptible to electromagnetic interference or other sources of wireless interference. In one embodiment, the gaming controller 115 and the gaming console 206 can have an integrated wireless interface for wireless communications therebetween. It is contemplated that the AMS application can in whole or in part be executed by computing resources of the gaming controller 115, the gaming console 206, or combinations thereof.

Figure 4:
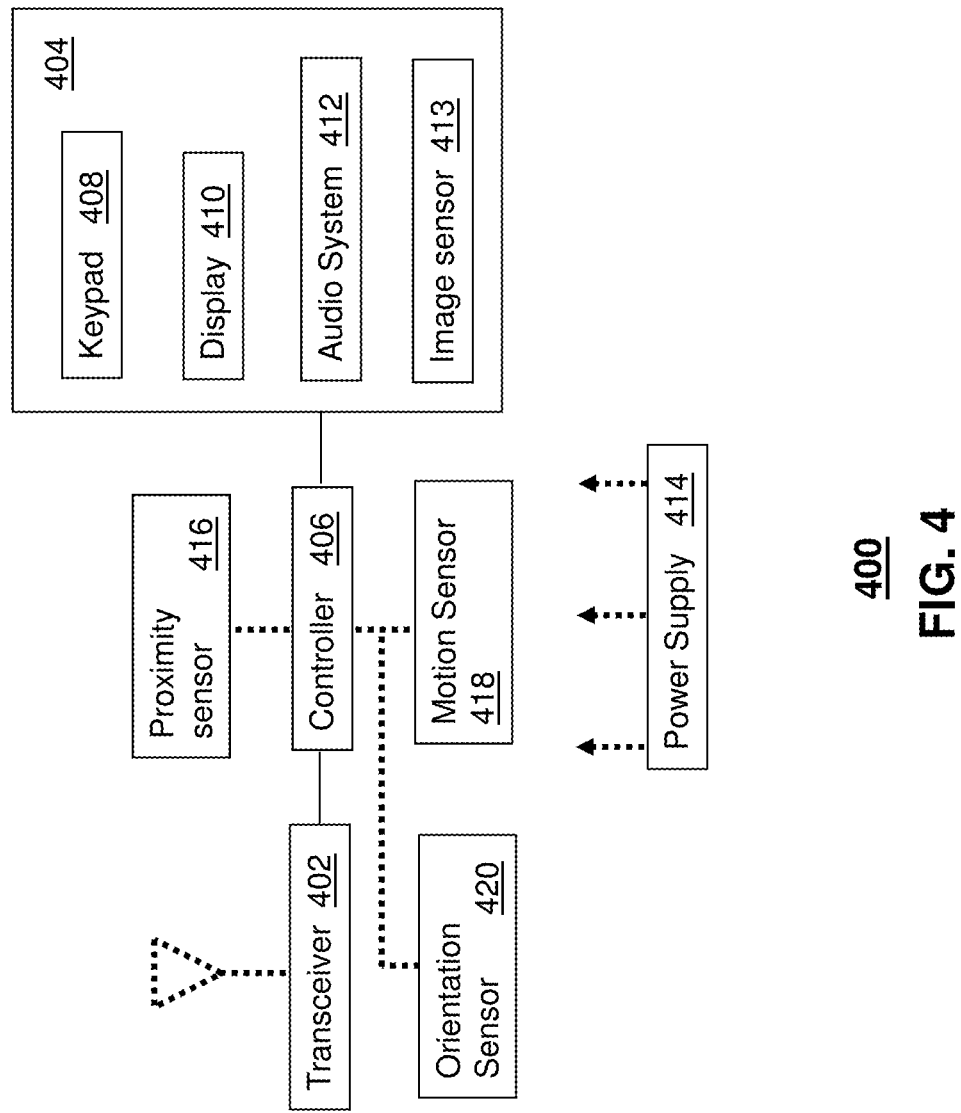
FIG. 4 depicts an illustrative embodiment of a communication device.

FIG. 4 depicts an illustrative embodiment of a communication device 400. The communication device 400 can serve in whole or in part as an illustrative embodiment of the devices depicted in FIGS. 1-3. The communication device 400 can include a wireline and/or wireless transceiver 402 (herein transceiver 402), a user interface (UI) 404, a power supply 414, a proximity sensor 416, a motion sensor 418, an orientation sensor 420, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400.

In an embodiment where the display 410 is touch-sensitive, a portion or all of the keypad 408 can be presented by way of the display 410 with navigation features (e.g., an iPad™, iPhone™, or Android™ phone or tablet). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements.

The UI 404 can also include an audio system 412 that utilizes common audio technology for conveying low volume audio (such as audio heard only in the proximity of a human ear) and high volume audio (such as speakerphone for hands free operation, stereo or surround sound system). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images and performing image recognition therefrom.

The power supply 414 can utilize common power management technologies such as replaceable or rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 416 can utilize proximity sensing technology such as an electromagnetic sensor, a capacitive sensor, an inductive sensor, an image sensor or combinations thereof. The motion sensor 418 can utilize motion sensing technology such as an accelerometer, a gyroscope, or other suitable motion sensing technology to detect movement of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the present disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4 to accommodate implementations of the devices described by the present disclosure. These variant embodiments are contemplated by the present disclosure.

Figure 5:
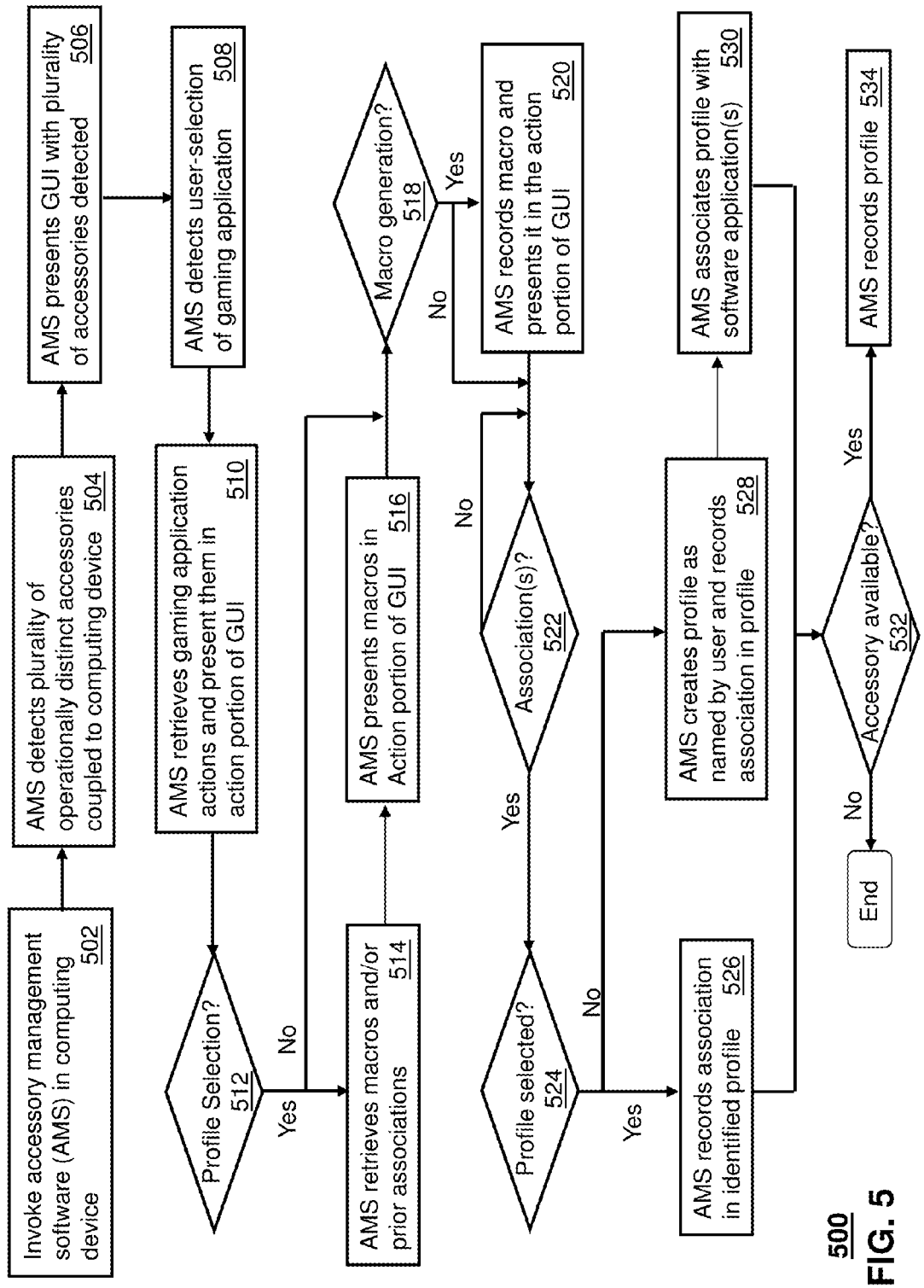
FIGS. 5-7 depict processes describing illustrative embodiments of the AMS application.
Figure 6:
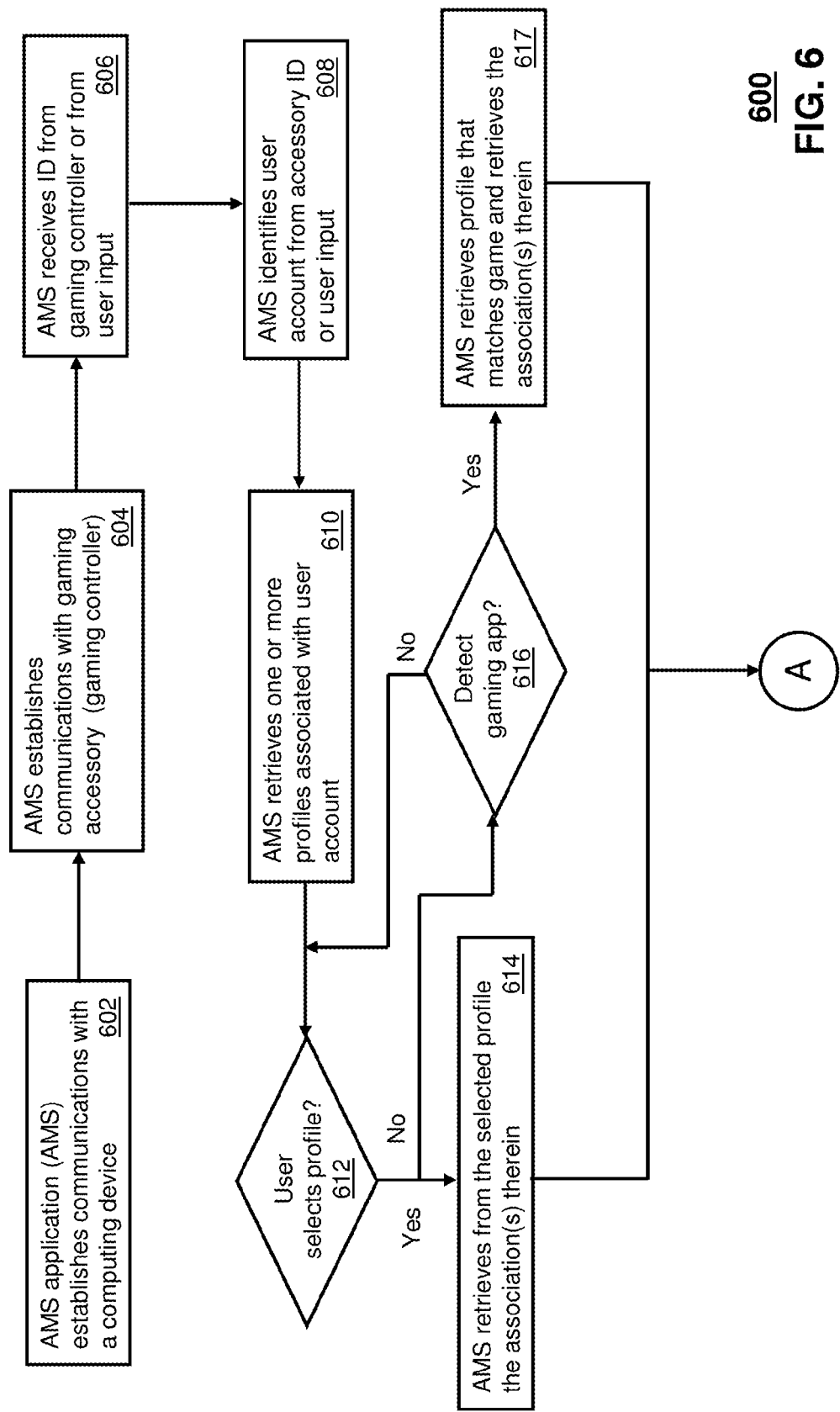
Figure 7:
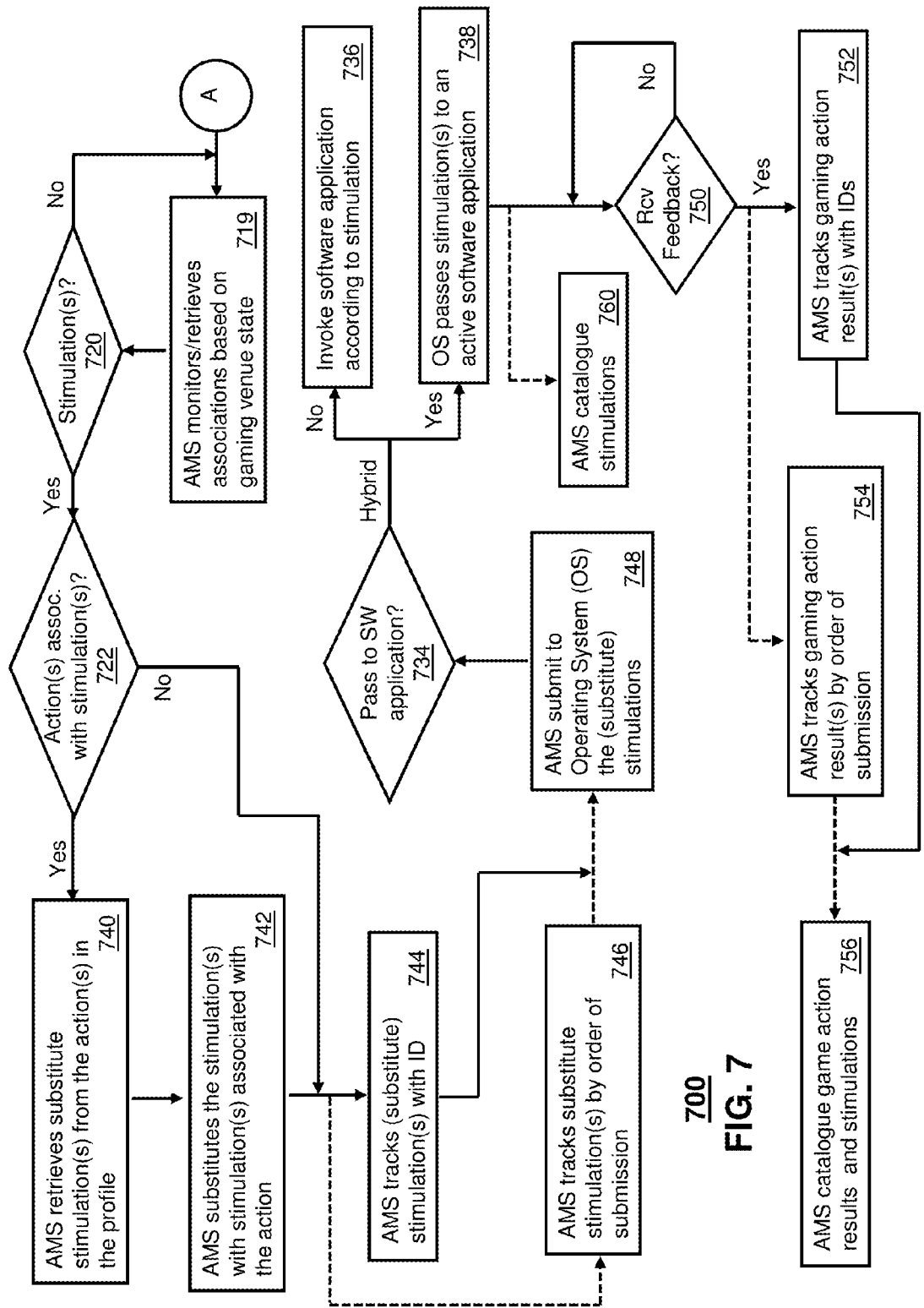

FIGS. 5-7 depict processes 500-700 describing illustrative embodiments of the AMS application. A first process 500 can begin with step 502 in which the AMS application is invoked in a computing device. The computing device can be a remote server (not shown), the gaming console 206 of FIGS. 2-3, or any other computing device with suitable computing resources. The invocation step can result from a user selection of the AMS application from a menu or iconic symbol presented on a desktop of the computing device by an operating system (OS) managing operations thereof. In step 504, the AMS application can detect by way of drivers in the OS multiple operationally distinct accessories communicatively coupled to the computing device. The accessories can be coupled to the computing device by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device (or an integral part of the computing device) and which can control aspects of the OS and/or a software application operating in the computing device. An accessory can represent for example a keyboard, a touch screen display, a gaming pad, a gaming controller, a tablet, a mouse, a joystick, a paddle, a steering wheel, pedals, a light gun, a microphone, or a headset with a microphone just to mention a few.

In step 506, the AMS application presents a GUI 101 such as depicted in FIG. 1 with operationally distinct accessories such as a keyboard 108, and a gaming controller 115. The GUI 101 presents the accessories 108-116 in a scrollable section 117. One or more accessories can be selected by a user with a mouse pointer. In this illustration, the keyboard 108 and the gaming controller 115 were selected for customization. Upon selecting the keyboard 108 and the gaming controller 115 from the scrollable window of section 117, the AMS application presents the keyboard 108 and the gaming controller 115 in split windows 118, 120, respectively, to assist the user during the customization process.

In step 508, the AMS application can be programmed to detect a user-selection of a particular software application such as a game. This step can be the result of the user entering in a Quick Search field 160 the name of a gaming application (e.g., World of Warcraft™ or WoW). Upon identifying a gaming application, the AMS application can retrieve in step 510 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack." For ease of use, the "Actions" 130 section of the GUI is presented descriptively rather than by a description of the input function(s) of a particular accessory.

Any one of the Actions 130 can be associated with one or more input functions of the accessories being customized in windows 118 and 120 by way of a drag and drop action or other customization options. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or selectable options of the gaming controller 115 to make an association with an input function of one of these accessories. Actions of one accessory can also be associated with another accessory that is of a different category. For example, key depressions "Ctrl A" of the key board 108 can be associated with one of the buttons of the gaming controller 115 (e.g., the left button 119).

In one embodiment, a Melee Attack action can be associated by dragging this action to either the left button 119 or right button 121 of the gaming controller 115. Thus, when the selected button is depressed, the stimulus signal that is generated by the selected button of the gaming controller 115 can be substituted by the AMS application with the Melee Attack action. In another embodiment, the Melee Action can be associated with a combination of key button presses (e.g., simultaneous depression of the left and right buttons 119, 121, or a sequence of button depressions: two rapid left button depressions followed by a right button depression).

In yet another embodiment, the Melee Action can be associated with movement of the gaming controller 115 such as, for example, rapid movement or shaking of the gaming controller 115. In a further embodiment, the AMS application can be adapted to make associations with two dimensional or three dimensional movements of the gaming controller 115 according to a gaming venue state. For example, suppose the player's avatar enters a fighter jet. In this gaming venue state, moving the left navigation knob forward can be associated by the AMS application with controlling the throttle of the jet engines. Rapidly moving the gaming controller 115 downward can represent release of munitions such as a bomb.

In a gaming venue state where the gamer's avatar has entered a building, lifting of the gaming controller 115 above a first displacement threshold can be associated with a rapid movement of the avatar up one floor. A second displacement threshold can be associated with a rapid movement of the avatar down one floor—the opposite of the first displacement threshold. Alternatively, the second displacement threshold could be associated with a different action such as jumping between buildings when the avatar is on the roof of a building.

The AMS application can associate standard stimuli generated by manipulating a gaming accessory with substitute stimuli that control gaming actions of a video game. The AMS application can be adapted to perform these associations based on a gaming venue state such as the ones described above. Accordingly, the associations made between stimuli supplied by an accessory such as the gaming controller 115 can be venue state dependent. The gaming venue state can be a description of a gaming state (e.g., entering a tank which requires the use of gaming controls for a tank), captured images of the gaming venue state (e.g., one or more still images of a tank, or a video of an avatar entering a tank), and/or application programming instructions (API) messages which can be received from the gaming application to enable the AMS application to identify the occurrence of a particular gaming venue state.

At step 512 the AMS application can also respond to a user selection of a profile. A profile can be a device profile or master profile invoked by selecting GUI button 156 or 158, each of which can identify the association of gaming actions with input functions of one or more accessories. If a profile selection is detected in step 512, the AMS application can retrieve in step 514 macro(s) and/or prior associations defined by the profile. The actions and/or macros defined in the profile can also be presented in step 516 by the AMS application in the actions column 130 of the GUI 101 to modify existing profile associations or create new associations.

In step 518, the AMS application can also respond to a user selection to create a macro. A macro in the present context can mean any actionable command which can be recorded by the AMS application. An actionable command can represent a sequence of stimuli generated by manipulating input functions of an accessory, a combination of actions in the Action section 130, an identification of a software application to be initiated by an operating system (OS), or any other recordable stimulus to initiate, control or manipulate software applications. For instance, a macro can represent a user entering the identity of a software application (e.g., instant messaging tool) to be initiated by an OS upon the AMS application detecting through speech recognition a speech command.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a joystick of the gaming controller 115, recordable selections of buttons of the gaming controller 115, and so on. Macros can also be combinations of the above illustrations with selected actions from the Actions 130 menu. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, navigation knob movements of the gaming controller 115, etc.) and/or by manual entry in field 144 (e.g., typing the name and location of a software application to be initiated by an OS, such as an instant messaging application, keyboard entries such as Ctrl A, etc.). Once the macro is created, it can be tested by selecting button 150 which can repeat the sequence specified in field 144. The clone button 153 can be selected to replicate the macro sequence if desired. Fields 152 can also present timing characteristics of the stimulus sequence in the macro with the ability to modify and thereby customize the timing of one or more stimulations in the stimulus sequence. Once the macro has been fully defined, selection of button 154 records the macro in step 520. The recording step can be combined with a step for adding the macro to the associable items Actions column 130, thereby providing the user the means to associate the macro with input functions of the accessories (e.g., one or more keys of the keyboard 108, buttons of the gaming controller 115, etc.).

In step 522, the AMS application can respond to drag and drop associations of actions and input functions of the keyboard 108 or the gaming controller 115. Associations can also be made based on the two or three dimensional movements of the gaming controller 115. If user input indicates that a user is performing an association, the AMS application can proceed to step 524 where it can determine if a profile has been identified in step 512 to record the association(s) detected. If a profile has been identified, the associations are recorded/stored in the profile in step 526. If a profile has not been identified in step 512, the AMS application can create a profile in step 528 for recording the detected associations. In the same step, the user can name the newly created profile as desired. The newly created profile can also be associated with one or more gaming software applications in step 530 for future reference. The AMS application can also record in a profile in step 526 associations based on gaming venue states. In this embodiment the same stimuli generated by the gaming controller 115 can result in different substitutions based on the gaming venue state detected by the AMS application.

The AMS application can be adapted to utilize image processing technology to detect a gaming venue state according to pre-stored images or video clips stored in the profile. For example, the AMS application can use image processing technology to identify an avatar of a gamer and track what the avatar does as directed by the gamer. For example, if the avatar enters a tank, the image processing technology of the AMS application can detect a gaming venue state associated with the use of a tank, and thereby identify associations between accessory stimuli and substitute stimuli according to the detected gaming venue state.

Referring back to step 526, once the associations have been recorded in a profile, the AMS application can determine in step 532 which of the accessories shown illustratively in FIGS. 1-3 are programmable and available for programming. If the AMS application detects that the accessories (e.g., keyboard 108, gaming controller 115) are communicatively coupled to a computing device from which the AMS application is operating (e.g., gaming console 206) and programmable, the AMS application can proceed to step 534 of FIG. 5 where it submits the profile and its contents for storage in one of the accessories (e.g., the gaming controller 115 in FIGS. 2-3) or the dongle 203. Once the gaming controller 115, dongle 203, or combinations thereof are programmed with the profile, such devices can perform stimuli substitutions according to the associations recorded by the AMS application in the profile. Alternatively, the AMS application can store the profile in the gaming console 206 of FIGS. 2-3 and perform substitutions of stimuli supplied by the gaming controller 115 according to associations recorded in the profile by the AMS application.

The GUI 101 of FIG. 1 presented by the AMS application can have other functions. For example, the GUI 101 can provide options for layout of the accessory selected (button 122), how the keyboard is illuminated when associations between input functions and actions are made (button 134), and configuration options for the accessory (button 126). The AMS application can adapt the GUI 101 to present more than one functional GUI page. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics from stimulation information and/or gaming action results captured by the AMS application. Selecting button 106 can also cause the AMS application to adapt the GUI 101 to present promotional offers and software updates.

The steps of process 500 in whole or in part can be repeated until a desirable pattern is achieved of associations between stimulus signals generated by accessories and substitute stimuli. It would be apparent to an artisan with ordinary skill in the art that there can be numerous other approaches to accomplish the embodiments described by process 500 or variants thereof. These undisclosed approaches are contemplated by the present disclosure.

FIG. 6 depicts another process 600 for illustrating the operations of the AMS application for either of the configurations shown in FIGS. 2-3. In the configurations of FIGS. 2-3, the AMS application can be operating in whole or in part from the gaming controller 115, the dongle 203, the gaming console 206, a remote server (not shown), or a computing device such as a desktop computer (also not shown). For illustration purposes, it is assumed the AMS application operates from the gaming console 206. The process 600 can begin with the AMS application establishing communications in steps 602 and 604 between the gaming console 206 and a gaming accessory such as the gaming controller 115, and a headset 114 such as shown in FIG. 1. These steps can represent for example a user starting the AMS application from the gaming console 206 and/or the user inserting at a USB port of the gaming console 206 a connector of a USB cable tethered to the gaming controller 115, which invokes the AMS application. In step 606, the gaming controller 115 and/or headset 114 can in turn provide the AMS application one or more accessory ID's, or the user can provide by way of a keyboard or the gaming controller 115 user identification. With the accessory ID's, or user input the AMS application can identify in step 608 a user account associated with the gaming controller 115 and/or headset 114. In step 610, the AMS application can retrieve one or more profiles associated with the user account.

In step 612, the user can be presented by way of a display coupled to the gaming console 206 profiles available to the user to choose from. If the user makes a selection, the AMS application proceeds to step 614 where it retrieves from the selected profiles the association(s) stored therein. If a selection is not made, the AMS application can proceed to step 616 where it can determine whether a software gaming application (e.g., video game) is operating from the gaming console 206 or whether the gaming console 206 is communicating with the software gaming application by way of a remote system communicatively coupled to the gaming console 206 (e.g., on-line gaming server(s) presenting, for example, World of Warcraft™). If a gaming software application is detected, the AMS application proceeds to step 617 where it retrieves a profile that matches the gaming application detected and the association(s) contained in the profile. As noted earlier, association(s) can represent accessory stimulations, navigation, speech, the invocation of other software applications, macros or other forms of suitable associations that result in substitute stimulations. The accessory stimulations can be stimulations that are generated by the gaming controller 115, as well as stimulations from other accessories (e.g., headset 114), or combinations thereof.

Once a profile and its contents have been retrieved in either of steps 614 or step 617, the AMS application can proceed to step 719 of FIG. 7 where it monitors for a change in a gaming venue state based on the presentations made by the gaming application, or API messages supplied by the gaming application. At the start of a game, for example, the gaming venue state can be determined immediately depending on the gaming options chosen by the gamer. The AMS application can determine the gaming venue state by tracking the gaming options chosen by a gamer, receiving an API instruction from the gaming application, or by performing image processing on the video presentation generated by the gaming application. For example, the AMS application can detect that the gamer has directed an avatar to enter a tank. The AMS application can retrieve in step 719 associations for the gaming controller 115 for controlling the tank.

The AMS application can process movements of the gaming controller 115 forwards, backwards, or sideways in two or three dimensions to control the tanks movement. Similarly, rotating the gaming controller 115 or tilting the gaming controller 115 forward can cause an accelerometer, gyro or magnetometer of the gaming controller 115 to provide navigational data to the AMS application which can be substituted with an action to cause the tank to turn and/or move forward. The profile retrieved by the AMS application can indicate that the greater the forward tilt of the gaming controller 115, the greater the speed of the tank should be moving forward. Similarly, a rear tilt can generate navigation data that is substituted with a reverse motion and/or deceleration of the forward motion to stop or slow down the tank. A three dimensional lift of the mouse can cause the tank to steer according to the three dimensional navigation data provided by the gaming controller 115. For example, navigation data associated with a combination of a forward tilt and right bank of the gaming controller 115 can be substituted by the AMS application to cause an increase in forward speed of the tank with a turn to the right determined by the AMS application according to a degree of banking of the gaming controller 115 to the right. In the above embodiment, the three dimensional navigation data allows a gamer to control any directional vector of the tank including speed, direction, acceleration and deceleration.

In another illustration, the AMS application can detect a new gaming venue state as a result of the gamer directing the avatar to leave the tank and travel on foot. Once again the AMS application retrieves in step 719 associations related to the gaming venue state. In this embodiment, selection of buttons of the gaming controller 115 can be associated by the AMS application with weaponry selection, firing, reloading and so on. The movement of the gaming controller 115 in two or three dimensions can control the direction of the avatar and/or selection or use of weaponry. Once the gaming venue state is detected in step 719, the AMS application retrieves the associations related to the venue state, and can perform substitutions of stimuli generated by the gaming controller 115, and/or speech commands received by microphone of the headset 114.

The AMS application can monitor in step 720 stimulus signals generated by the accessories coupled to the gaming console 206. For example, the stimulus signals can be generated by the gaming controller 115 in response to a gamer manipulating the gaming controller 115, and/or by generating speech commands detected by the headset 114. If a simulation is detected at step 720, the AMS application can determine in step 722 whether to forward the detected stimulation(s) to an Operating System (OS) of the gaming console 206 without substitutions. This determination can be made by comparing the detected stimulus signal(s) to association(s) in the profile. If the detected stimulus signal(s) match the association(s), then the AMS application proceeds to step 740 where it retrieves substitute stimulus signal(s) in the profile. In step 742, the AMS application can substitute the detected stimulus signal(s) with the substitute stimulus signal(s) in the profile. In one embodiment, the AMS application can track in step 744 the substitute stimulus signals by updating these stimulus signals with a unique identifier such as a globally unique identifier (GUID). In this embodiment, the AMS application can also add a time stamp to each substitute stimulus to track when the substitution was performed.

In another embodiment, the AMS application can track each substitute stimulus signal according to its order of submission to the gaming application. For instance, sequence numbers can be generated for the substitute stimulus signals to track the order in which they were submitted to the gaming application. In this embodiment, the substitute stimulus signals do not need to be updated with sequence numbers or identifiers so long as the order of gaming action results submitted by the gaming application to the AMS application remain in the same order as the substitute stimulus signals that were originally submitted.

For example, if a first stimulus signal sent to the gaming application by the AMS application is a command to shoot, and a second stimulus signal sent to the gaming application is a command to shoot again, then so long as the gaming application provides a first a game action result for the first shot, followed by a game action result for the second shot, then the substitute stimulus signals will not require updating with sequence numbers since the game action results are reported in the order that the stimulus signals were sent. If on the other hand, the game action results can be submitted out of order, then updating the stimulus signals with sequence numbers or another suitable identifier is performed to enable the AMS application to properly track and correlate stimulus signals and corresponding gaming action results.

Once the stimulus signals received in step 720 have been substituted with other stimulus signals in step 742, and the AMS application has chosen a proper tracking methodology for correlating gaming action results with stimulus signals, the AMS application can proceed to step 748 and submit the substitute stimulus signals to the OS of the gaming console 206. If in step 722 the detected stimulus signal(s) do not match an association in the profile, then the AMS application proceeds to one of steps 744 or 746 in order to track the stimulus signals of the accessory. Once the AMS application has performed the necessary steps to track the stimulus signal as originally generated by the accessory, the AMS application proceeds to step 748 where it submits stimulus signals (with or without substitutions) to the OS of the gaming console 206 with or without tracking information as previously described.

In step 734, the OS determines whether to invoke in step 736 a software application identified in the stimulation(s) (e.g., gamer says "turn on team chat," which invokes a chat application), whether to forward the received stimulus signals to the gaming software application in step 738, or combinations thereof. Contemporaneous to the embodiments described above, the AMS application can monitor in step 750 for game action results supplied by the gaming application via a defined API. The game action results can be messages sent by the gaming application by way of the API of the gaming application to inform the AMS application what has happened as a result of the stimulus signals sent in step 738. For instance, suppose the stimulus signal sent to the gaming application in step 738 is a command to shoot a pistol. The gaming application can determine that the shot fired resulted in a miss of a target. The gaming application can respond with a message which is submitted by way of the API to the AMS application that indicates the shot fired resulted in a miss. If IDs such as GUIDs were sent with each stimulus signal, the gaming application can submit game action results with their corresponding GUID to enable the AMS application to correlate the gaming action results with stimulations having the same GUID.

For example, if the command to shoot included the ID "1234," then the game action result indicating a miss will include the ID "1234," which the AMS application can use in step 752 to identify the stimulation having the same ID. If on other hand, the order of game action results can be maintained consistent with the order of the stimulus signals, then the AMS application can correlate in step 754 stimulus signals with game action results by the order in which the stimulus signals were submitted and the order in which the game action results were received. In step 756, the AMS application can catalogue stimulus signals and game action results. In another embodiment, the AMS application can be adapted to catalogue the stimulations in step 760. In this embodiment, step 760 can be performed as an alternative to steps 750 through 756. In another embodiment, step 760 can be performed in combination with steps 750 through 756 in order to generate a catalogue of stimulus signals, and a catalogue for gaming action results correlated to the stimulations.

Figure 8:
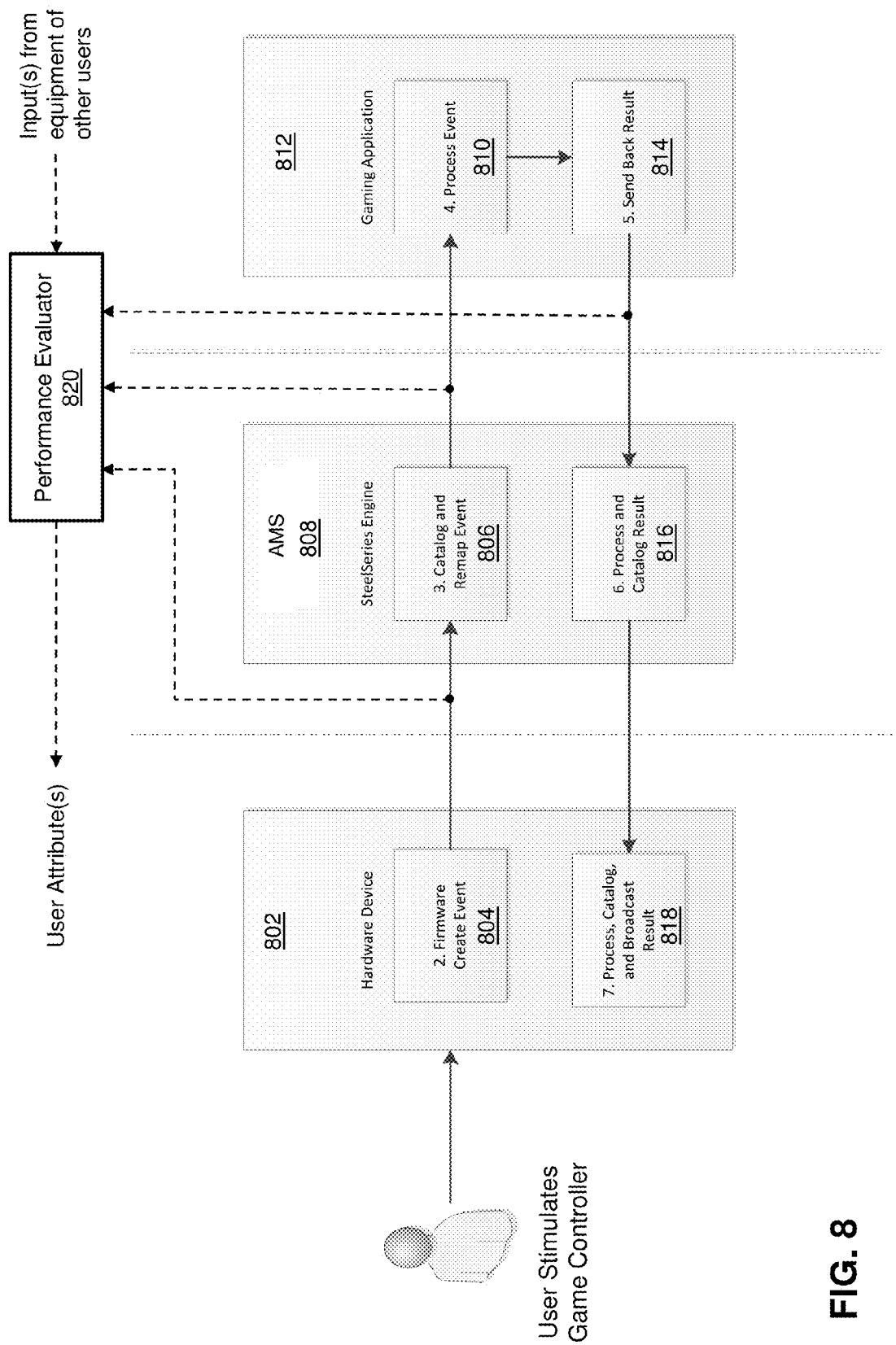
FIG. 8 depicts an illustrative embodiment of a system operating at least in part according to the processes of FIGS. 5-7.
Figure 9:
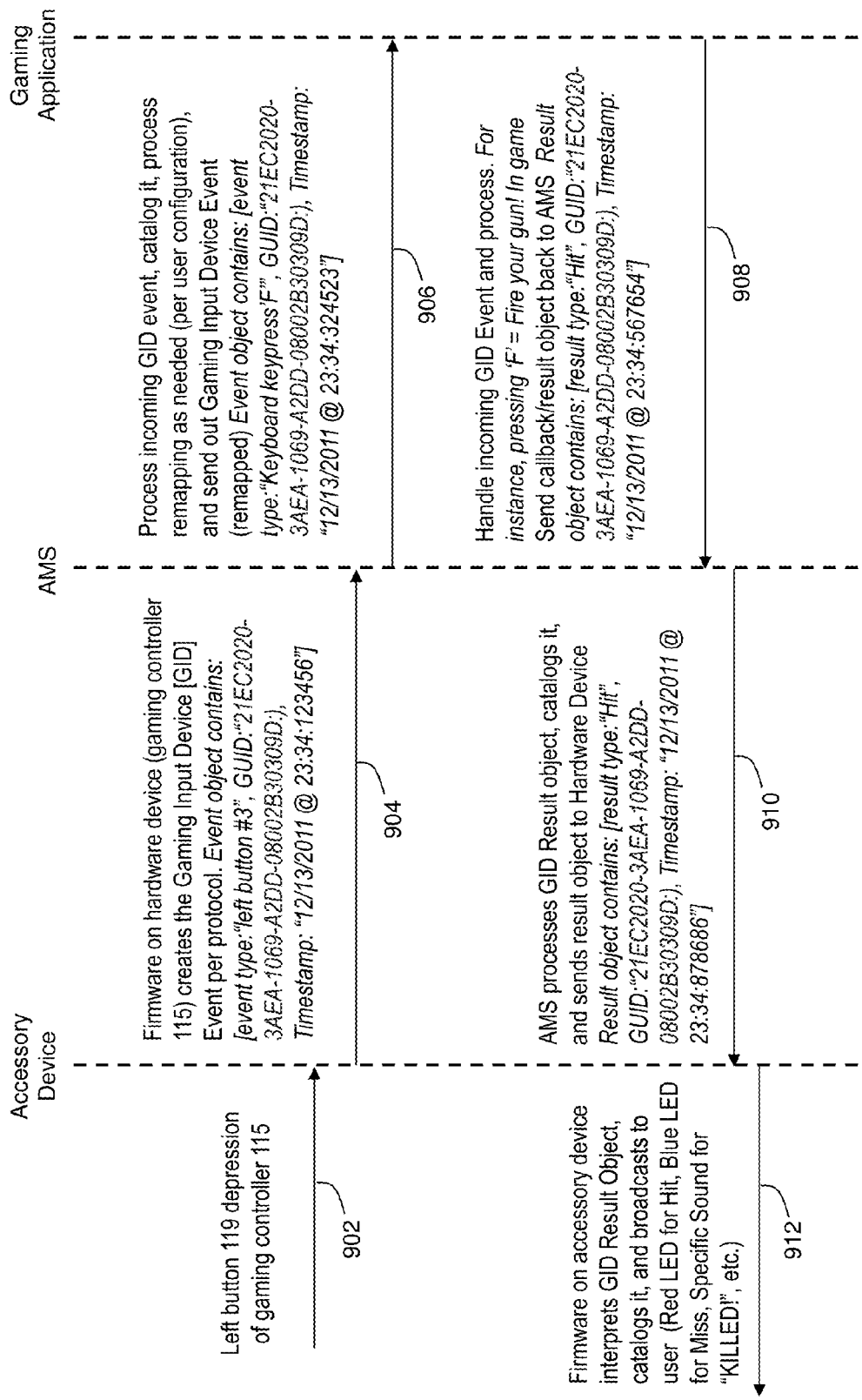
FIG. 9 depicts a flow diagram of an illustrative embodiment of a communication process utilized by the system of FIG. 8.

FIGS. 8-9 illustrate embodiments of a system with a corresponding communication flow diagram for correlating stimulus signals and gaming action results. In this illustration a user clicks the left button 119 of a hardware device 802, such as the gaming controller 115 (FIG. 1). The gaming controller 115 can include firmware (or circuitry) 804, which performs a create event function as depicted by event 2 in FIG. 8. The button depression and the event creation are depicted in FIG. 9 as steps 902 and 904. In step 904, the firmware 804 of the gaming controller 115 can, for example, generate an event type "left button #3," and a unique GUID with a time stamp, which is submitted to the AMS application. Referring back to FIG. 8, a catalog and/or remapping process 806 of the AMS application 808 catalogues event 3, and if a substitute stimulus signal has been predefined, remaps the event according to the substitution. The substitution signal associated with the remapped event is then transmitted to an event processing module 810 of the gaming application 812 at event 4. Event 3 of FIG. 8 is depicted as step 906 in FIG. 9. In this illustration, the AMS application 808 substitutes the "left button #3" depression stimulus signal with a "keyboard 'F'" depression stimulus signal, which can be interpreted by the gaming application 812 as a "fire" command. The AMS application 808 in this illustration continues to use the same GUID, but substitutes the time stamp for another time stamp to identify when the substitution took place.

Referring back to event 4, the gaming application 812 processes the event and in a reporting process module 814 sends back at event 5 a game action result to the AMS application 808, which is processed by an AMS result processing application 816 at event 6. The AMS application 808 then submits the results to an accessory result process module 818 at event 7. Events 4 and 5 are depicted as step 908 in FIG. 9. In this step, the gaming application 812 processes the stimulus signal of the "keyboard F" as an action to fire the gamer's gun, and then determines from the action the result from logistical gaming results generated by the gaming application 812.

In the present illustration, the action of firing resulted in a hit. The gaming application 812 submits to the AMS application 808 the result signal of type "Hit" with a new time stamp, while utilizing the same GUID for tracking purposes. At step 910, the AMS application 808 correlates the stimulus signal "left button #3 (and/or the substitute stimulus signal "keyboard F") to the game result "Hit" and catalogues them in memory. The AMS application 808 then submits to the hardware device 802 (e.g., gaming accessory or controller 115) in step 910 the game action result signal "Hit" with the same GUID, and a new time stamp indicating when the result signal was received. Upon receiving the message from the AMS application 808, the game controller 802 in step 912 processes the "Hit" by asserting a red LED on the accessory (e.g., left button 119 illuminates in red or other LED of the gaming controller 115 illuminates in red) to indicate a hit. Other notification notices can be used such as another color for the LED to indicate misses, a specific sound for a hit, or kill, a vibration or other suitable technique for notifying the gamer of the game action result.

The system can include a performance evaluator 820 that allows for a collection and/or evaluation of stimulation records based on user stimulation of a game controller 802. The performance evaluator 820 receives one or more stimulus signals from the game controller 802 of the user. Alternatively or in addition, when the system includes the AMS application 808, the performance evaluator 820 can receive one or more substitute stimulus signals from the catalog and/or remapping process 806 of the AMS application 808, when present. The performance evaluator 820 can generate or otherwise retain a stimulation record of some or all of the received stimulation signals. The performance evaluator 820 can be configurable or otherwise programmable at least with regard to generation of stimulation records and/or processing of one or more of the stimulus signals or stimulation record. In at least some embodiments, the performance evaluator 820 receives a game action result from the reporting process module 814. The performance evaluator 820 can modify one or more of the stimulus signal, the substitute stimulus signal, or measures derived from one or more of the stimulus signal and the substitute stimulus signal.

In an embodiment where the AMS application 808 receives gaming results from a gaming application 812 via an API as described above, the communication flow diagram shown in FIG. 9 can be modified with a more comprehensive protocol that includes a weapon type being monitored, misses, non-kill hits (i.e., a hit that does not result in a kill), kill hits, and loss of life rate.

Each of the AMS application 808 and the performance evaluator 820 can present performance factors of each gamer, and the type of weapons being tracked (e.g., sniper rifle, machine gun, hand gun). To identify which weapon is being used at any point in time during a gaming session, either of the AMS application 808 can highlight the weapon in a distinguishable color such as blue while keeping all other weapon rows in gray. The AMS application 808 and/or the performance evaluator 820 can calculate a metric related to stimulation record, such as an average hit rate from the misses, non-kill hits, and kill hits. The AMS application 808 or the performance evaluator 820 can generate user profiles that can be processed by a social gaming network, as disclosed herein, to match a user to other users and/or to one or more teams.

As the gamer is competing, the input functions of the gaming controller 115 can be highlighted and moved (in the case of knobs) to show the audience how the gaming controller 115 is being used by the gamer. The health of the gamer's avatar can be shown below the gaming controller 115. In a tournament setting, such performance factors can be shown in side-by-side monitors, or together in a Jumbo-Tron™ display such as those used in sporting events or the like.

In an embodiment where the gaming application does not provide gaming action results (e.g., the video gaming application does not provide an API), either or both of the AMS application 808 and the performance evaluator 820 can be adapted to present a gamer's performance based on the stimulus signals generated, and where applicable, the substitute stimulus signals submitted to the gaming application. The performance of the gamers can be presented according to the type of weapons used, the key depressions invoking substitutions, the macros invoked, and the rate of transmission of stimuli to the gaming application.

For example, for gamer #1, the simultaneous depression of the up and down arrows invoked the macro team chat, while using the sniper rifle. The gamer shot the rifle 14 times with 4 shots in rapid succession. Upon depressing the left "1" button of a front section of the gaming controller 115 of gamer #1, the AMS application invoked substitute stimuli transmitted to the gaming application which switches the use of the sniper rifle to the machine gun. A subsequent depression of the same button can cause a substitute stimuli generated by the AMS application to return to the sniper rifle. A depression of the right "1" button by gamer #1 resulted in substitute stimuli generated by the AMS application to call for air support. Gamer #2 shows that s/he has not invoked substitute stimuli for the machine gun. This may be because the gamer has not pre-programmed the AMS application to associate stimuli generated by the gaming controller 115 with substitute stimuli, or because the gamer has chosen not to invoke substitute stimuli with a particular key depression (or sequence of key depressions).

In at least some embodiments, monitoring one or more of stimuli generation and substitutes can be used to rate players' performances. For example, a gamer that has a tendency to perform rapid fire on a machine gun without saving ammunition may be viewed as a poor game tactic. Comparing such statistics between gamers can be used to show performance lead factors between the gamers.

Figure 10:
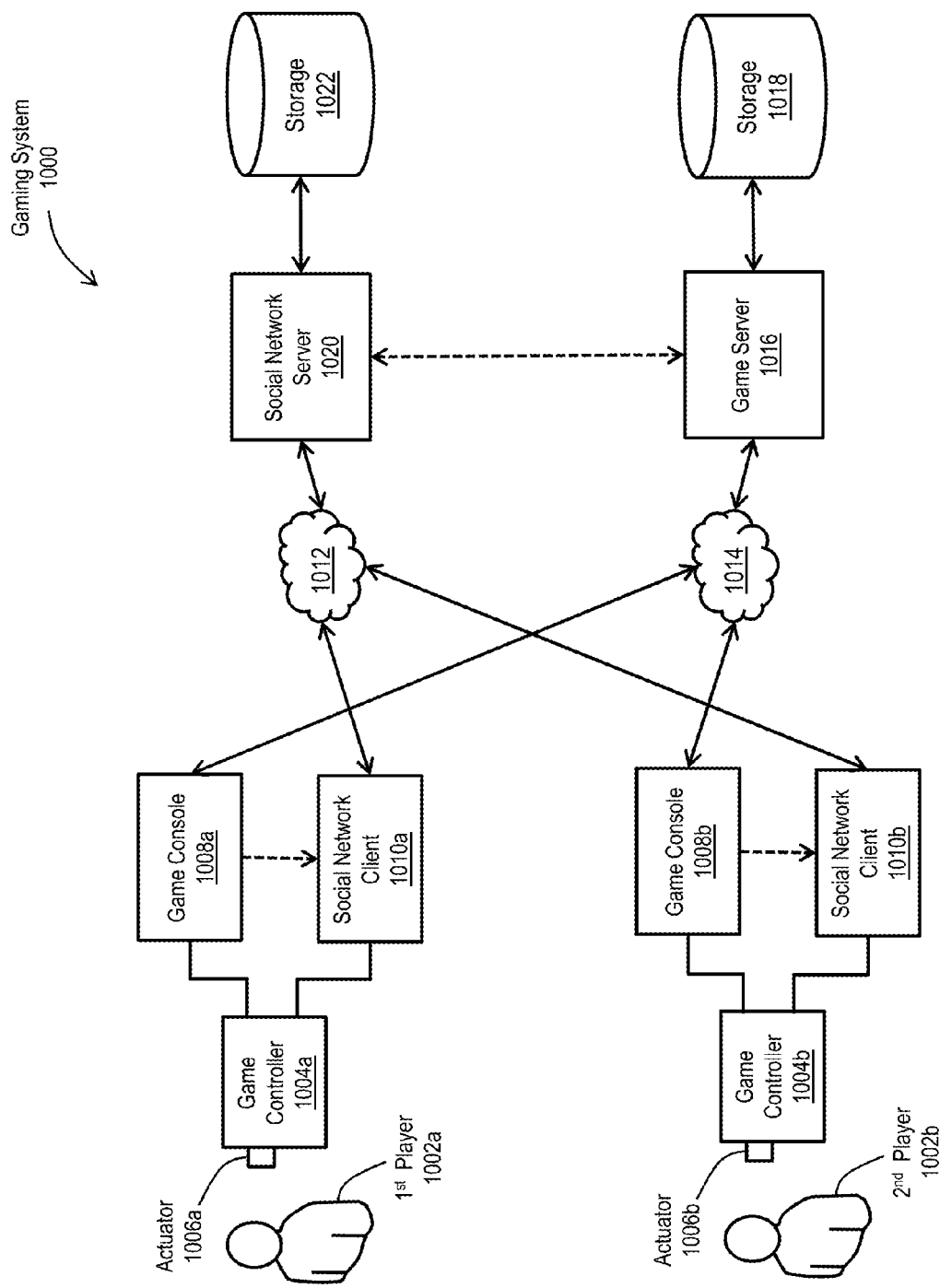
FIG. 10 depicts a functional block diagram of an illustrative embodiment of a gaming system enabling an association of players.

FIG. 10 illustrates a block diagram of an example of a gaming system 1000 enabling an association of players. The gaming system 1000 includes a first user device, such as a first game controller 1004*a* having a first actuator 1006*a* that can be manipulated by a first user 1002*a*. The gaming system 1000 also includes at least a second user device, such as a second game controller 1004*b*, also having a first actuator 1006*a* that can be manipulated by a second user 1002*b*. It is understood that in at least some embodiments, either of the first and second game controllers 1004*a*, 1004*b* (generally 1002) can include two or more actuators 1006. It is also understood that the first and second game controllers 1004*a*, 1004*b* can be identical or different. In at least some embodiments, the first game controller 1004*a* is shared between the first and second users 1002*a*, 1002*b*.

Each of the game controllers 1004 is coupled to a respective game console 1008*a*, 1008*b* (generally 1008). The controllers 1004 can be coupled to the respective game consoles by hardwired interface, a wireless interface, or a combination of hardwired and wireless as are generally well understood. Each of the game consoles 1008 is in communication with a game server 1016 through a network 1014. Electronic games can be hosted on one or more of the game consoles 1008 and the game server 1016 allowing the users 1002*a*, 1002*b* (generally 1002) to invoke and manage features of a gaming application, allowing the users to participate in a shared gaming experience. For example, the users 1002 can participate as independent players in multi-player games, as competitors in competitive games, or as cooperators, e.g., members of a team, in team-based multi-player games. One or more of the game consoles 1008 and the game server 1016 can maintain game state information, updating such information responsive to events, such as user input received through the game controllers 1004 and game action, including game action results responsive to user input. Game state information, e.g., including graphical representations, scores, chat, etc., can be shared with the users 1002 through one or more of the game console 1008, the game server 1016 or other game-related components. In at least some embodiments, the game server 1016 is in communication with one or more storage devices 1018 that may be local or remote and configured to store information related to game application(s), users, rankings, and the like. It is understood that suitable combinations of game-related components, such as audio-visual displays, headsets and the like, although not illustrated here, are employed by the users during the course of game play.

Each of the game controllers 1004 can take any controller generally understood to allow for user interaction with an electronic activity, such as an electronic or computer game. By way of non-limiting example, each controller 1004 can include one or more of a keyboard, a touch screen display, a gaming pad, a gaming controller, a tablet, a mouse, a joystick, a paddle, a steering wheel, pedals, a light gun, a microphone, or a headset with a microphone, including any of the example controller or accessory devices disclosed herein.

In operation, the game controller 1004 provides one or more input functions that can be stimulated by a user to invoke and manage features of the gaming application. Stimulation can be accomplished by one or more of button depressions, motion of the game controller, e.g., Wii® remote controller for the Nintendo® Wii, or of an object moving in relation to the game controller, e.g., Xbox Kinect®, pointing, navigation or speech, rhythm, e.g., musical instrument controllers, such as a guitar controller of GuitarHero® of Harmonix® Music Systems, just to name a few.

In response to stimulation of the actuator 1006, the game controller 1004 generates a stimulus signal. The stimulus signal can be indicative of the actuator 1006, for example, providing an indication of which actuator 1006 of a multi-actuator game controller 1004 was stimulated. Alternatively or in addition, the stimulus signal can identify when the actuator was stimulated, e.g., by way of a time stamp, and/or in what order the actuator was stimulated, e.g., by way of a sequence reference or identification. The stimulus signal can be related to a game action, for example, by way of a look-up table, a predetermined mapping of stimulus signals to game actions, or the like. For example, depressing the left button on the mouse 110 (FIG. 1) can generate a stimulus signal indicative of the left button mouse click. Stimulation of the input function(s) can cause action to occur within a context of an electronic game. The stimulus signal can be represent a particular game action, such as a tactical action "Reload." Likewise, a stimulation comprising a simultaneous keyboard depressions "Ctrl+A" can represent a tactical action referred to as a "Melee Attack." It is understood that in at least some embodiments, the gaming system 1000 includes an AMS application associated with one or more of the game controllers 1004 that can operate as disclosed herein, e.g., to modify associations of stimulus signals and resulting game actions.

The gaming system 1000 can be combined with a social network that provides various services for assisting gamers in locating, and establishing contact relationships with, other gamers. For example, in one embodiment, gamers can identify other gamers based on their affiliations with particular games or other gaming skills. The system also provides a mechanism for a gamer to selectively establish contact relationships or connections with other gamers, and to grant permissions for such other gamers to view personal information of the gamer. The system may also include features for enabling gamers to identify contacts of their respective contacts. In addition, the system may automatically notify gamers of personal information updates, such as updated or revised performance measures as determined according to game-controller hardware statistics, made by their respective contacts.

A social network of an electronic gaming community, referred to herein as a social gamer network, provides an online environment for gamers to communicate and exchange personal information for team-building and collaborative purposes. Intentions can vary from looking for a one time affiliation (a trial gaming round), short-term relationships (a particular tournament or gaming event), and long-term relationships (affiliation as a permanent team member). A social gamer network may require gamers to give out certain pieces of information, such as game preferences, measure(s) of game performance, or other performance measures as determined according to game-controller hardware statistics. This usually includes a user's identity, e.g., an online persona or tag, preferred games and corresponding proficiency level, e.g., including identification of an independent rating source, location, e.g., nationality, region, city, gaming interests, and perhaps a graphical representation, such as a picture, logo, avatar. This allows other gamers, online gaming services, and others involved, e.g., game tournaments and/or leagues, to search or be searched by some sort of criteria. At the same time gamers participating in the social network can maintain a degree of anonymity similar to online dating services, e.g., by choosing to withhold identifying information, such as name, affiliation, location.

Figure 11:
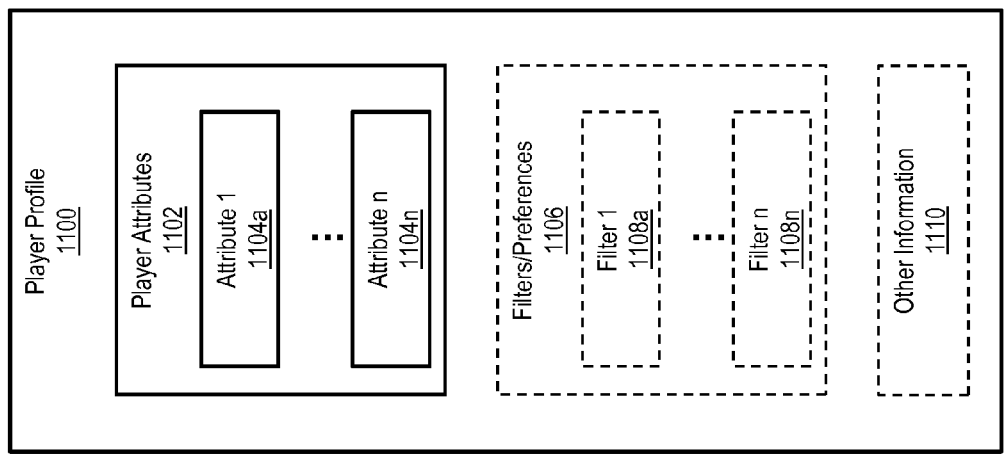
FIG. 11 depicts in more detail a schematic diagram of an illustrative embodiment of a data structure utilized in the gaming system of FIG. 10.

Gamers participating in a social gaming network can create personal profiles to meet and communicate with others. An example of such a profile is illustrated in FIG. 11, which depicts a schematic diagram of an illustrative embodiment of a data structure utilized in a social gaming network. A player profile 1100 includes one or more player attributes 1102. In the illustrative embodiment, the player attributes 1102 can be differentiated into one or more individual attributes 1104a, 1104n (generally 1104) that can be used, individually or in various combinations, to distinguish or otherwise differentiate players participating in the social gaming network. The player profile can optionally include one or more additional elements or components, such as filters and/or preferences 1106 and, more generally, other information 1110 (shown in phantom).

The player attributes 1102 can include a stimulation record of an electronic gaming accessory, such as an electronic game control actuator or controller. In at least some embodiments, the stimulation record is based on, so called, "raw" hardware data. The attributes 1104, for example, can include a number of stimulations of a particular actuator 1006 (FIG. 10), or a rate of stimulations of the actuator 1006. A number of stimulations can be a running or historical total, for example, measured or otherwise recorded during a definable time period, such as a minute, hour, day. Alternatively or in addition, the number of stimulations can be a total accrued since an occurrence of a particular event, such as initiation of a game, a tournament, a particular date, or lifetime. Stimulation records of rate information can include an average rate, for example, determined as the number of stimulations over a definable time period, such as a second, a minute, an hour, or in relation to an event, such as a game a tournament, and so forth.

As disclosed above, stimulus signals can be received from the game controller 1004 in response to user stimulations and recorded or otherwise processed. Processing of stimulation signals and/or stimulation records can include statistical processing. Thus, the stimulation signals and/or stimulation records can be collected, organized, analyzed, interpreted and presented as raw data and/or as statistical results, which refer to stimulation related quantities, such as a mean, median, mode, standard deviation, and so forth, calculated form a set of data derived from stimulation of the game controller 1004.

In at least some embodiments, one or more of the user attributes 1104 include values indicative of a proficiency of the stimulation of the gaming accessory. Such results can be obtained, for example, by processing of one or more of the raw stimulation record results or the statistical results determined from the same. Measure, such as a user's proficiency or experience, can be estimated or otherwise inferred from the raw stimulation records and/or statistical data related to the same. By way of non-limiting example, a user's dexterity, proficiency can be concluded from a stimulation record of the game controller 1004 of the user reflecting a rate of stimulations. A rate above a particular threshold or range might indicate such dexterity and proficiency.

Collection and/or processing of stimulation records, for example, to determine user attributes 1104, can be performed in one or more of the game controller 1004, the social network client 1010, the social network server 1020, the game server 1016 (FIG. 10), the performance evaluator 820, the accessory management system 808, or other hardware device 802 (FIG. 8). One or more of the user attributes 1104 can be modified by game action results. For example, in addition to receiving stimulation signals indicative of use stimulation of the actuator during the course of a gaming application, collection and/or processing can include consideration of one or more game action results related to one or more of the stimulation signals. By way of non-limiting example, a stimulation signal indicative of a game action of shooting can result in a game action result of a hit, a kill or a miss. A miss can be inferred, in at least some instances, from a lack of receipt of any game action result of a hit or a kill. A user attribute related to the stimulation signal to shoot can be modified by the game action result, for example, to determine one or more of a percentage or ration of shoots that result in a hit, a kill and/or a miss. Once again, user proficiency and skill can be inferred in one or more of the user attributes from user attributes related to game-action modified stimulation records.

The filters/preferences 1106 can include information entered by the player, such as preferred games, preferred roles or characters within one or more games, preferred weapons or similar gaming implement, etc. Alternatively or in addition the filters/preferences 1106 can include information determined automatically and/or identified by a third party. By way of non-limiting example, filters can include in indication of experience, such as game playing time on average as may server to differentiate causal gamers from more experience, or so called "hard core" players. Other filters can identify a number or different games, or game categories, and the like, to provide an indication of how versatile a player might be. Still other filters can identify one or more player characteristics, such as aggressiveness, risk tolerance, accuracy, and combinations thereof. Still other filters can related more particularly to a player's stimulation of a game controller. For example, a filter can be established to differentiate among players and/or roles according to a threshold, e.g., a minimum threshold of player actions per minute. Filters and/or preferences 1106, such as those disclosed herein, can be used to filter social interactions, e.g., matchmaking between players, players and teams, etc.

Figure 12:
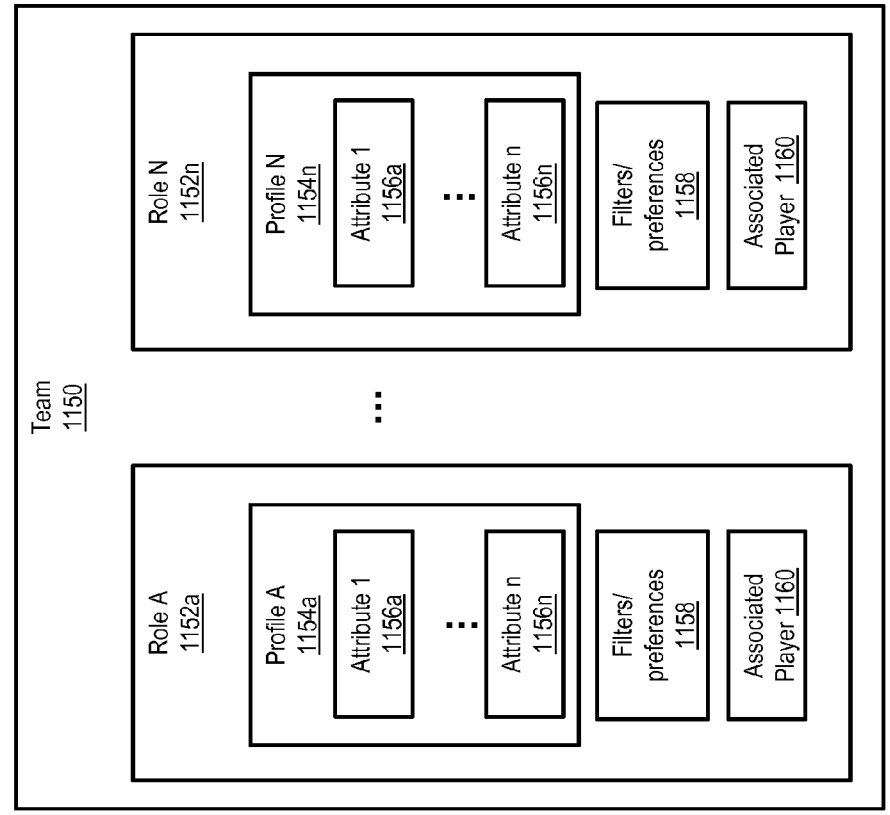
FIG. 12 depicts in more detail a schematic diagram of an illustrative embodiment of another data structure utilized in the gaming system of FIG. 10.

A social gaming network can include target profiles identifying a profile of a game player being sought after. An example of such a profile is illustrated in FIG. 12, which depicts a schematic diagram of an illustrative embodiment of another data structure utilized in a social gaming network. A team profile 1150 includes one or more roles 1152a, 1152n (generally 1152). Each role 1152 includes a respective target profile 1154a, 1154n (generally 1154). Each target profile, in turn, includes a collection of one or more target attributes 1156a, 1156n (generally 1156). The target attributes 1156 can correspond to one or more of the user attributes 1104 disclosed herein. At least some of the target attributes 1156 can include a value and/or a range of values indicative of a threshold, e.g., minimum or maximum, or a preferred or optimal value of a user attribute sought for the particular role 1152.

The illustrative example relates to a team profile 1150. The particular roles 1152 can be determined, for example, as a minimum requirements for a team, e.g., a minimum number of roles, as an ideal or model team, or as an exceptional, e.g., "dream" team. It is conceivable that more than one team profiles 1150 can be established for a team in relation to the same gaming application. The one or more team profiles 1150 can be compared to one or more player profiles 1100, for example, in order to identify or otherwise match one or more players to a particular team. Thus, an entity, such as an individual, a league, or other related organization, can use the social gaming network to create teams. Alternatively or in addition, existing teams can use the social gaming network to add and/or replace players, for example, to improve a team's performance and ranking. Associations of individual gamers to each other and/or to one or more teams can be stored in a record of such associations by the social network server 1020, for example, in the storage device 1022 (FIG. 10).

In at least some embodiments, the social network clients 1010 can be used by a team, for example, to solicit one or more team members by creating or otherwise updating an individual and/or team target profile. For example, the social network client 1010 includes or is otherwise accessible by a user interface, such as a graphical user interface. The user interface can provide one or more controls to allow an individual and/or a team to create or otherwise modify a target profile. Once created/modified, the target profile can be submitted to the social network server 1020 for correlation with a collection of user profiles 1100 that are also stored on the storage device 1022 or otherwise accessible to the social network server 1020. An example of operation of the social network server to match players to other players and/or teams is described in more detail below.

Figure 13:
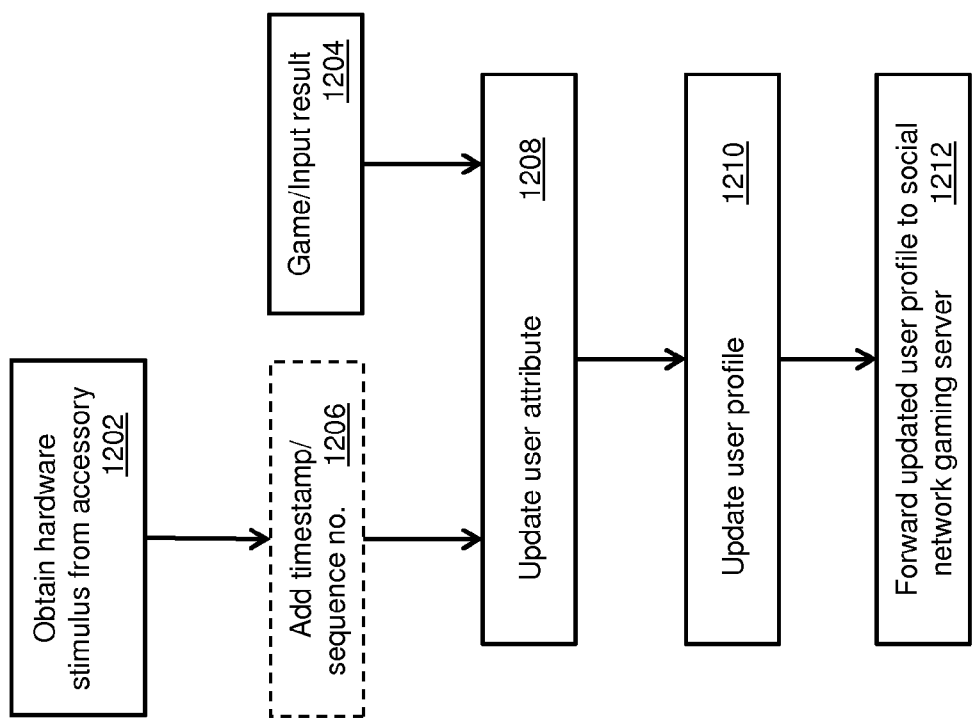
FIG. 13 depicts a flow diagram of an illustrative embodiment of a process for profiling a player according to a record of manipulation of gaming accessory.

FIG. 13 depicts a flow diagram of an illustrative embodiment of a process for profiling a player according to manipulation of gaming accessory. An indication of stimulus of a game accessory is obtained at step 1202. In at least some embodiments, a time reference, such as a time stamp, can be added or otherwise associated with the stimulus at step 1206 (shown in phantom). Alternatively or in addition, a sequence number or other suitable reference suitable for distinguishing or removing ambiguity associated with the stimulus can be added or otherwise associated at step 1206.

A user attribute can be updated at 1208 in response to the stimulus of the game accessory. For example, the performance evaluator 820 (FIG. 8) receives a stimulus signal from a game controller 802 indicating a particular actuator or key combination was initiated at the game controller of a user. When performed during the course of an electronic game, the stimulus signal causes a game action result. The game action result can be obtained at step 1204. In at least some embodiments, a user profile is updated at 1208 in response to the indication of the stimulation of the game accessory in view of the game action result obtained at step 1204.

A stimulation record can be updated responsive to receipt of one or more of the stimulus signal or the game action result. A user profile 1100 can be updated at step 1210 in response to the updated user attribute at step 1208. Update of the user profile can include updating, changing, generating one or more player attributes 1102 of the player profile 1100. Alternatively or in addition, one or more attributes 1104 are updated or otherwise modified based on one or more of the stimulus signal or the game action result. In at least some embodiments, one or more of the steps of the process 1200 are performed automatically without user intervention. In particular, one or more of the steps of the process 1200 can be guarded from alteration or other tampering using established techniques for securing or otherwise encrypting data. For example, one or more of the user attributes 1104 or the user profile 1100 can be stored in an encrypted fashion. The acts of updating at stems 1208 or 1210 can include unencrypting pre-stored attributes and/or profiles, updating and re-encrypting before storing again. In such a manner, integrity of at least some of the user attributes 1104 of the user profile 1100 can be maintained or otherwise assured to a community of the social gaming network.

By way of illustrative example, a stimulation of a gaming accessory, such as a game controller 802, indicative of a shoot command in a context of a game is received at step 1202. A record of the shoot command stimulus signal can be time stamped and/or associated with a sequence identifier at step 1206. The shoot command, alone or together with one or more of the time stamp and the sequence identifier, is forwarded to one or more of a game console 1008 or a game application server 1016. Depending upon a state of the game at the time of the command, as well as information related to the shoot command, e.g., aim, weapon, ammunition, health, progression of the game is altered. Such alternation, for example, can include a hit, a kill or a miss, a change in a state of ammunition, health, etc.

In some embodiments, the process 1200 is implemented responsive to each hardware stimulation of the game controller 802. Namely, one or more user attributes and/or the user profile are updated in real time or near real time responsive to each stimulation of the game controller 802. To the extent such immediately updated results are not necessary, a processing burden and possibly communication bandwidth, depending upon a division of labor, can be reduced by updating one or more of the user attributes or user profiles at intervals other than responsive to each hardware stimulation. For example, the indication of stimulus of a game accessory at step 1202, with or without the timestamp and/or sequence identifier at step 1206 and any game input result at step 1204 can be stored in a record or otherwise buffered without updating either of the user attribute or the user profile. At an opportune time, e.g., after completion of a game, or a tournament, or perhaps at the end of a day, or upon initiation of a subsequent log on event, one or more of the user attribute or the user profile can be updated at steps 1208, 1210 according to the stored or otherwise buffered results. The updated user profile can be forwarded to a social network server 1020 (FIG. 10) at step 1212.

Figure 14:
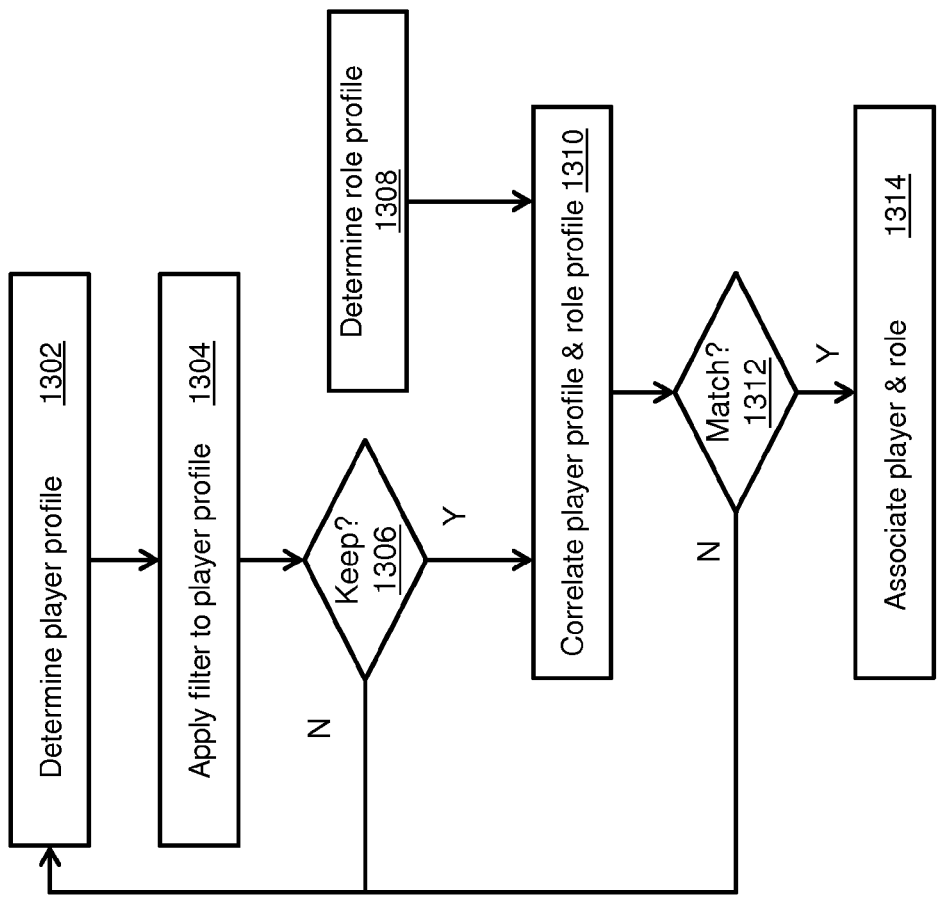
FIG. 14 depicts a flow diagram of an illustrative embodiment of a process for associating players according to a player profiling as in FIG. 13.

FIG. 14 depicts a flow diagram of an illustrative embodiment of a process for associating players according to a player profiling as in FIG. 13. A player profile is determined at step 1302. By way of non-limiting example, a player profile, such as the example player profile 1100 (FIG. 11) disclosed herein, can be determined by a social network server 1020 by one or more of retrieving the player profile 1100 from a storage device 1022 or receiving the player profile 1100 from a social network client 1010.

A filter can be applied to the player profile 1100 at step 1304. Parameters of the filter can be determined by one or more of preferences of a user associated with the player profile 1100. Alternatively or in addition, filter parameters and/or preferences can be determined by one or more values determined from a respective role 1152 of a team profile 1150. Such filters and or parameters can be implemented according to a predetermined logic. For example, conflicting preferences can be resolved according to Boolean logic, e.g., AND, OR, exclusive OR, Not and the like. One or more of the filters and/or parameters of either the player profile 1100 and the team profile 1150 can be predetermined to have priority over the other, essentially replacing the other in a circumstances of a conflict.

Examples of filtering parameters include game playing time on average, e.g., allowing for matches between players and/or teams to be determined based on experienced players having game playing time above a threshold value. Another example includes a versatility attribute. A players versatility can be ranked or otherwise scored ranging from a player that specializes in one game to a player that is experienced with many different games). Other filter parameters include weapon specifics. Thus, a player attribute may include a list of one or more weapons. A filter parameter may impose that any match include one or more required weapons. Other filter parameters include a measure of a player's aggressiveness and/or conservativeness, a player's character and/or weapon preference, a minimum threshold measure of hardware, e.g., stimulus, actions, such as player actions per minute. Such filter parameters add multiple dimensions that can be used in determining matches between players and other players and/or teams. For example, such multiple dimensions can be used to resolve conflicts or otherwise rank order among more than one possible matches. Thus, a matching process can select a preferred match from among a number of possible matches according to one or more of the filters/preferences.

Alternatively or in addition, filter results are evaluated at step 1306 prior to any correlation of the determined player profile and any target profile. Thus, only those player profiles determined to satisfy application of the filtering criteria at step 1304 are passed on at step 1306 for correlation. If the determined player profile is rejected or otherwise fails to satisfy the filtering criteria at step 1306, another player profile can be determined at step 1302 and the process repeated.

A role or target profile is determined at step 1308. The target profile can be obtained from a member of the social gaming network, such as a player, seeking an association with another player having attributes that satisfy the target profile, or a team seeking to identify a player matched to a particular team-member role. A correlation is performed at step 1310 between the determined player profile and the determined target profile. A result of the correlation is indicative of a suitability of the player represented by the determined player profile and the target profile determined at step 1308.

A match can be determined at step 1312. For example, a correlation having a value above a particular threshold value is deemed to be a suitable match. To the extent a correlation fails to satisfy criteria of a match at step 1312, another player profile is determined at step 1302 and the process repeated until a suitable match is determined at step 1312. To the extent that a correlation satisfies the match criteria at step 1312, an association can be formed between the player represented by the determined player profile and the determined target or role profile. Such associations can be indicative of an association between players, or an association between a player and a team. Upon determination of an association, a social network server 1020 can record or otherwise retain the association, for example, storing a record of the association in the storage device 1022. In at least some embodiments, the social network server 1020 reflects a change in an association status, e.g., other information 1110 (FIG. 11) of a user profile 1100, and/or an associated player field 1160 of each role 1152 of a team profile 1150.

In some embodiments, a player advertises himself/herself by requesting that the social network server 1020 identify a target profile of another player and/or team soliciting a particular role. In such an embodiment, the player profiles of steps 1302 and 1304 are replaced with target profiles and the determined role profile of step 1308 is replaced with the advertising player profile. Thus, filtering, matching and so forth are performed for different target profiles for the advertising player.

From the foregoing descriptions, it would be evident to an artisan with ordinary skill in the art that the aforementioned embodiments can be modified, reduced, or enhanced without departing from the scope and spirit of the claims described below.

For instance, one or more of the AMS application 808, the performance evaluator 820, the social network client 1010 and the social network server 1020 can record stimulus signals and/or gaming results for a game session and store this data for an extended period of time for each of a number of gamers. In addition, one or more of the AMS application 808 and the performance evaluator 820, the social network client 1010 and the social network server 1020 can store multiple recorded game sessions for each gamer and can be adapted to compare a history of game sessions to assess how each gamer's performance has evolved. Each gamer's improvement or degradation detected by the AMS application 808 and/or the performance evaluator 820, and the social network client 1010 over a number of gaming sessions can be reported to the social network server 1020, e.g., by way of an updated user profile. The results can also be reported in a gaming tournament, on-line games, or other suitable setting.

One or more of the AMS application 808 and the performance evaluator 820, the social network client 1010 and the social network server 1020 can compare a gamer's performance in a particular game to a gaming session recorded from a prior tournament for the same game or another game. Performance in the present context can mean a comparison of only stimulus signals (e.g., accessory-generated stimulus signals and/or substitute stimulus signals). This embodiment may be user-selectable (i.e., user selects stimulus analysis only) by way of a GUI presented by the AMS application 808, or the performance evaluator 820, the social network client 1010 and the social network server 1020, or the AMS application 808 may apply this embodiment automatically in instances where the AMS application 808 does not receive gaming action results from the gaming application 812 due to a lack of an API or other suitable interface to receive gaming action results from the gaming application.

For any one of the foregoing embodiments, one or more of the AMS application 808 and the performance evaluator 820, the social network client 1010 and the social network server 1020 can detect improvements or degradations in performance between a present tournament game and the previously recorded tournament game and report the results to the gamer and/or an audience of on-line gamers or a public audience at a tournament via display devices, such as monitors. The foregoing embodiments can be applied in a private setting (i.e., only visible to the gamer) and/or a social network of gamers who share and present results via the AMS application, the performance evaluator 820, the social network client 1010 and the social network server 1020 or other, traditional social network such as FaceBook™ or other suitable social network platform.

In yet other embodiments, one or more of the AMS application 808 and the performance evaluator 820, the social network client 1010 and the social network server 1020 can be adapted to associate a gamer with one or more of another gamer or a team according to the gamer's hardware performance. A gamer profile can be determined based on the gamer's hardware performance or proficiency. Once established, the gamer profile can be compared to other gamer profiles and/or to target profiles of gamers being sought or otherwise advertised for. In one embodiment, one or more of the AMS application 808 and the performance evaluator 820, the social network client 1010 and the social network server 1020 can be adapted to present a GUI where it presents a list of gamers and a stimulus record and/or user attribute from each gamer of a group of gamers. The GUI can enable a user to select a particular gamer and a particular recorded gaming session of the selected gamer for comparison to a recorded (or live) gaming session of the user making the selection or another gamer of interest to the user (e.g., comparing the performance of two professional gamers).

It should be noted that gaming sessions recorded by one or more of the AMS application 808 and the performance evaluator 820, the social network client 1010 can be locally stored on a gamer's computing device (e.g., desktop computer or gaming console) or on a remote server managed by a service provider of the AMS application, or the performance evaluator 820, the social network client 1010 and the social network server 1020, or by a service provider that provides "Cloud" storing services. User profiles and/or associations of users can similarly be stored on a gamer's local computing device or a remote server.

In yet other embodiments, one or more of the AMS application 808 and the performance evaluator 820, the social network client 1010 and the social network server 1020 can be adapted to alert users when a particular gamer has achieved certain performance criteria established by a target profile. For instance, either or both of the AMS application 808 and the performance evaluator 820, the social network client 1010 and the social network server 1020 can respectively present a GUI to a gamer to identify performance criteria of interest (e.g., number of kill hits, average hit rate for a particular weapon, a particular ranking of a gamer for a particular gaming application, etc.). The identified performance criteria can be monitored by one or more of the AMS application 808 and the performance evaluator 820, the social network client 1010 and the social network server 1020 for the selected gamer and when one or more criteria have been achieved by the monitored gamer, either or both of the AMS application and the performance evaluator 820, the social network client 1010 and the social network server 1020 can respectively alert the interested user by suitable communication means such as email, short messaging system (SMS) text message, or a GUI of the AMS application when the interested user is engaging the AMS application.

In other embodiments, one or more of the AMS application 808 and the performance evaluator 820, the social network client 1010 and the social network server 1020 can compare the performance of the gamers to a community target profile localized to users of the gaming console 206, or all or a portion of on-line users which can span a large community of users of the gaming application. For example, although an average hit rate of 5% for a sniper rifle may seem low for one gamer, when these statistics are compared to other members of a community (e.g., other professional players), either or both of the AMS application 808 and the performance evaluator 820, the social network client 1010 and the social network server 1020 can respectively determine from prior performance records of members of the community (retrieved from a local or remote database) that the user's performance is in fact above average. Similar community comparisons can be performed for the weapon type "machine gun" and "hand gun." Either or both of the AMS application 808 and the performance evaluator 820, the social network client 1010 and the social network server 1020 can also monitor and track statistics of other gaming applications, which may have different weapon types. Similar statistics can be generated and compared to the performance of members of a community to which the gamer is associated.

In at least some embodiments, statistical results can be used to identify behavioral and/or skill patterns of a gamer. For instance, suppose a gamer appears to perform well as a sniper in one gaming application and bow and arrow marksman in a different gaming application. Either or both of the AMS application 808 and the performance evaluator 820, the social network client 1010 and the social network server 1020 can be respectively adapted to detect these correlations to indicate a skill set of the gamer that may be consistent between different games. For example, a sniper and bowman have a similar trait that requires marksmanship, calm nerves, and knowing when to strike. This trait can be identified, e.g., by the AMS application and can be used to identify other games in which the gamer may perform well. This trait can also be advertised to other gamers to promote teams.

The processes depicted in FIGS. 5-7 and 12 can be adapted to operate in whole or in part in a gaming accessory, in an operating system of a computer, in a gaming console, in a gaming application that generates the video game, in a dongle, or any other suitable software application and/or device.

The processes of FIGS. 7 and 12-13 can be adapted to ignore or filter game action results, which may not be relevant to the gamer or analysts. For instance, the either or both of the AMS application 808 and the performance evaluator 820, the social network client 1010 and the social network server 1020 can be adapted to ignore (or filter) game action results relating to navigation of the avatar (e.g., turn around, jump, etc.). Either or both of the AMS application 808 and the performance evaluator 820, the social network client 1010 and the social network server 1020 can also be adapted to ignore (or filter) game action results relating to preparatory actions such as reloading a gun, switching between weapons, and so on. In other embodiments, either or both of the AMS application 808 and the performance evaluator 820, the social network client 1010 and the social network server 1020 can be adapted to selectively monitor only particular stimulus signals and/or game result actions such as misses, non-kill hits, kills, and life of the avatar. Either or both of the AMS application 808 and the performance evaluator 820, the social network client 1010 and the social network server 1020 can also be adapted to monitor gaming action results with or without temporal data associated with the stimuli and game action results.

In some embodiments, either or both of the AMS application 808 and the performance evaluator 820, the social network client 1010 and the social network server 1020 can be respectively adapted to track stimuli (or substitutions thereof) by submission order, and order of gaming action results supplied by the gaming application, and perform cataloguing thereof by the respective order of stimuli and gaming action results. The items can be respectively catalogued by each of the AMS application 808 and the performance evaluator 820, the social network client 1010 and the social network server 1020 with or without temporal data.

In at least some embodiments, either or both of the AMS application 808 and the performance evaluator 820, the social network client 1010 and the social network server 1020 can be adapted to collect gaming action results for "all" or a substantial portion of stimuli (or substitutions thereof) transmitted to the gaming application. In this embodiment, either or both of the AMS application 808 and the performance evaluator 820, the social network client 1010 and the social network server 1020 can be adapted to enable a gamer to replay portions of the game to allow the gamer to visualize (in slow motion, still shots, or regular play speed) the actions taken by the gamer (i.e., accessory stimuli and/or substitute stimuli) to help the gamer identify areas of the game where his/her performance can be improved.

In at least some embodiments, either or both of the AMS application 808 and the performance evaluator 820, the social network client 1010 and the social network server 1020 can be implemented as a distributed system (e.g., one or more servers executing one or more virtual machines) enabling multiples users to control aspects of either or both of the AMS application 808 and the performance evaluator 820, the social network client 1010 and the social network server 1020. For example, in a tournament setting, gaming analysts having access to the AMS application can request a replay of portions of the game to demonstrate exceptional plays versus missed plays at a JumboTron™ display. The gamers can access either or both of the AMS application 808 and the performance evaluator 820, the social network client 1010 and the social network server 1020 to establish new substitute stimuli, perform calibrations on macros, or invoke or create additional gaming profiles. Portions of either or both of the AMS application 808 and the performance evaluator 820, the social network client 1010 and the social network server 1020 can also be implemented by equipment of unaffiliated parties or service providers of gaming services.

In some embodiments, either or both of the AMS application 808 and the performance evaluator 820, the social network client 1010 and the social network server 1020 can be respectively adapted to substitute an accessory stimulus (or stimuli) for a macro comprising a combination of substitute stimuli, and track the macro when gaming action results are received from the gaming application rather than track each individual substitute stimulus of the macro. Either or both of the AMS application 808 and the performance evaluator 820, the social network client 1010 and the social network server 1020 can be adapted to monitor macros by tracking an order of stimuli (or substitutes) associated with the macro that are transmitted to the gaming application and by tracking an order of gaming action results received from the gaming application, which are associated with the macro. Alternatively, or in combination, either or both of the AMS application 808 and the performance evaluator 820, the social network client 1010 and the social network server 1020 can add a unique identifier to the substitute stimuli to identify the stimuli as being associated with the macro.

Either or both of the AMS application 808 and the performance evaluator 820, the social network client 1010 and the social network server 1020 can be adapted to catalogue the gaming action results associated with the macro in a manner that allows the gamer to identify a group of gaming action results as being associated with the macro. Either or both of the AMS application 808 and the performance evaluator 820, the social network client 1010 and the social network server 1020 can also be adapted to collect sufficient data to assess each individual gaming action result of the macro (e.g., temporal data, hits, misses, etc.). The presentation of catalogued macro data can be hierarchical. For example, the AMS application can present a particular macro by way of a high level GUI that indicates the macro caused a kill. Either or both of the AMS application 808 and the performance evaluator 820, the social network client 1010 and the social network server 1020 can be adapted to enable the gamer to select a different GUI that enables the user to visualize a gaming action result for each stimulus of the macro to determine how effective the macro was in performing the kill, and whether further adjustments of the macro might improve the gamer's performance.

In some embodiments, either or both of the AMS application 808 and the performance evaluator 820, the social network client 1010 and the social network server 1020 can be respectively adapted to present more or less competitive information. In some embodiments, for example, either or both of the AMS application 808 and the performance evaluator 820, the social network client 1010 and the social network server 1020 can be adapted to present competitive information without the virtual peripherals. In one example, the AMS application can be adapted to present scrollable pages of competitive information with or without the virtual peripherals. In other illustrations, either or both of the AMS application 808 and the performance evaluator 820, the social network client 1010 and the social network server 1020 can be adapted to present competitive information without a viewing of the game or the gamer. Other variants of presenting competitive information or other data are contemplated by the present disclosure.

The foregoing embodiments are a subset of possible embodiments contemplated by the present disclosure. Other suitable modifications can be applied to the present disclosure.

Figure 15:
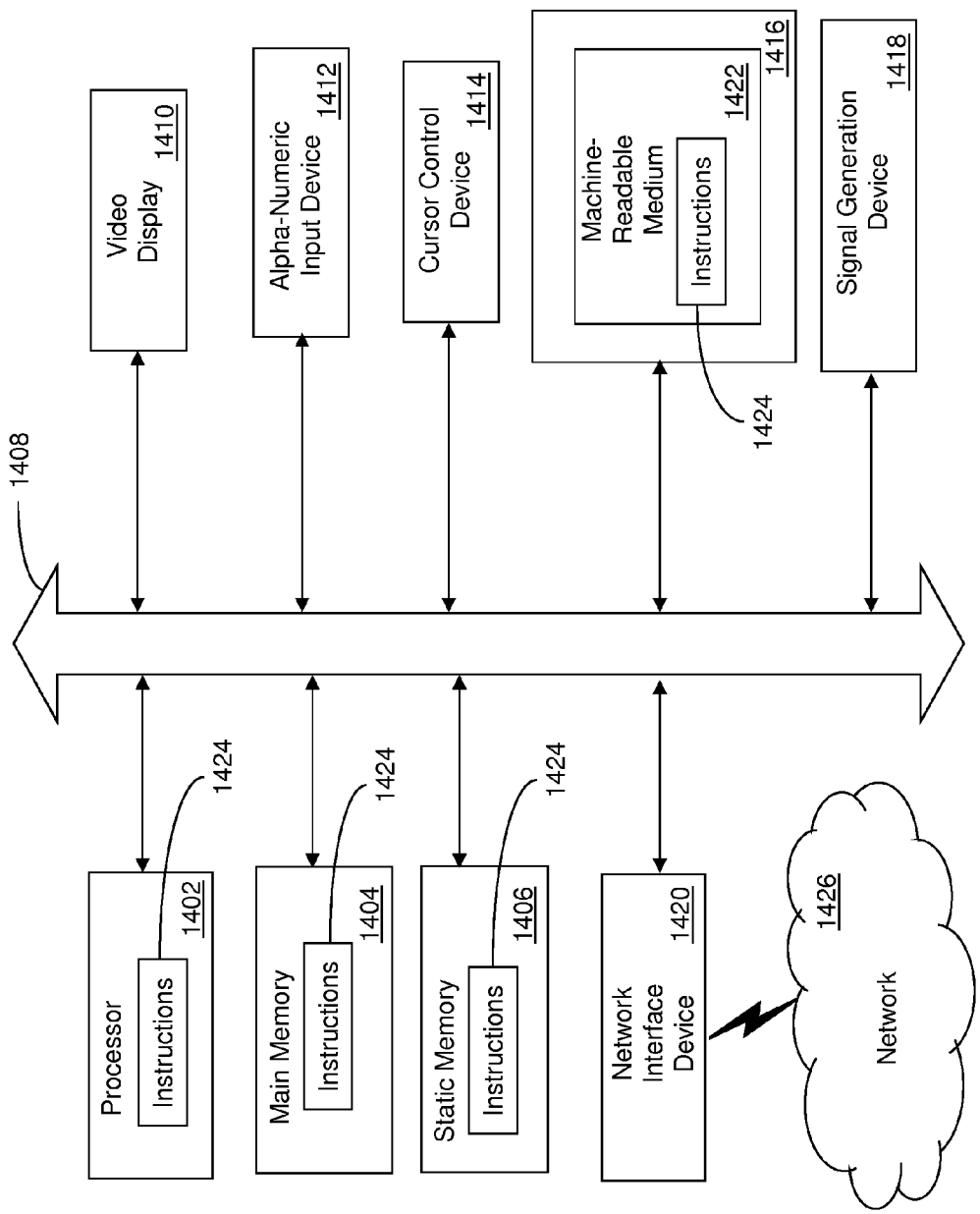
FIG. 15 depicts an illustrative diagrammatic representation of a machine in the form of a computer system within which a set of instructions, when executed, may cause the machine to perform any one or more of the methodologies disclosed herein.

FIG. 15 depicts an exemplary diagrammatic representation of a machine in the form of a computer system 1400 within which a set of instructions, when executed, may cause the machine to perform any one or more of the processes and techniques discussed above. One or more instances of the machine can operate as any of devices depicted in FIGS. 1-3. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the processes and techniques discussed herein, including processes and techniques related to the performance evaluator 820, the social network client 1010 and the social network server 1020.

The computer system 1400 may include a processor 1402 (e.g., a central processing unit (CPU), a graphics processing unit (GPU, or both), a main memory 1404 and a static memory 1406, which communicate with each other via a bus 1408. The computer system 1400 may further include a video display unit 1410 (e.g., a liquid crystal display (LCD), a flat panel, or a solid state display. The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 1420.

The disk drive unit 1416 may include a tangible computer-readable storage medium 1422 on which is stored one or more sets of instructions (e.g., software 1424) embodying any one or more of the processes, techniques or functions described herein, including those processes illustrated above. The instructions 1424 may also reside, completely or at least partially, within the main memory 1404, the static memory 1406, and/or within the processor 1402 during execution thereof by the computer system 1400. The main memory 1404 and the processor 1402 also may constitute tangible computer-readable storage media.

Dedicated hardware implementations including, but not limited to, application specific integrated circuits, programmable logic arrays and other hardware devices can likewise be constructed to implement the processes and techniques described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the processes and techniques described herein are intended for operation as software programs running on a computer processor. Furthermore, software implementations can include, but not limited to, distributed processing or component/object distributed processing, parallel processing, or virtual machine processing can also be constructed to implement the processes and techniques described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the processes and techniques of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 1400.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the present disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for matching players in a social gaming network, comprising:
   intercepting, by a processing system including a processor, a plurality of stimulus signals of an electronic game control actuator based on stimulation of the electronic game control actuator by a user;
   evaluating, by the processing system, the plurality of stimulus signals based on the stimulation of the electronic game control actuator for a plurality of users;
   determining, by the processing system, a plurality of attributes of the plurality of users based on the evaluating of the plurality of stimulus signals;
   determining, by the processing system, a team profile comprising a plurality of team-member profiles, wherein a target team-member profile of the plurality of team-member profiles comprises a target team-member attribute that is lacking in the team profile, wherein the team profile is associated with a team comprising of a plurality of team members playing a video game on the social gaming network, and wherein the plurality of team members are at a plurality of geographic locations;
   receiving, by the processing system, a plurality of filter values of the plurality of users;
   correlating, by the processing system, the plurality of attributes with the target team-member attribute; and
   matching, by the processing system, a select user of the plurality of users with the target team-member profile based on the correlating of the plurality of attributes with the target team-member attribute and based on the plurality of filter values to incorporate the target team-member attribute into the team profile to improve game performance of the team.

2. The method of claim 1, wherein the plurality of attributes comprises one of a performance measure of strength, a performance measure of weakness, or a combination thereof.

3. The method of claim 1, wherein an attribute of the plurality of attributes is indicative of a proficiency corresponding to the plurality of stimulus signals of the electronic game control actuator of the corresponding user of the plurality of users.

4. The method of claim 1, wherein the correlating of the plurality of attributes with the target team-member attribute comprises:
deriving, by the processing system, a measure of performance from the plurality of stimulus signals of the electronic game control actuator; and
comparing, by the processing system, the measure of performance and a target range of performance associated with the target team-member attribute, wherein a correlation is determined according to the measure of performance falling within the target range of performance.

5. The method of claim 1, wherein the target team-member profile is one of a plurality of predetermined team-member profiles associated with the team.

6. The method of claim 5, wherein the target team-member profile of the plurality of team-member profiles corresponds to a first gaming application.

7. The method of claim 6, further comprising determining, by the processing system, a statistic based on a detection of a repeated stimulus signal of the plurality of stimulus signals of the electronic game control actuator, and wherein the plurality of filter values comprise individual preferences of the plurality of users.

8. An apparatus for matching users of a social gaming network, comprising:
a memory that stores executable instructions; and
a processing system including a processor in communication with the memory, wherein the system responsive to executing the executable instructions, performs operations comprising:
detecting a plurality of stimulus signals based on stimulation of an electronic gaming accessory of a corresponding user;
determining a respective user attribute for each of a plurality of users, based on the plurality of stimulus signals of the electronic gaming accessory of the corresponding user of the plurality of users;
determining a target profile comprising a target attribute that is lacking in a team profile, wherein the team profile is associated with a team comprising of a plurality of team members playing a video game on the social gaming network, and wherein the plurality of team members are at a plurality of geographic locations;
receiving a plurality of filter values of the plurality of users;
correlating the respective user attribute for each of the plurality of users with the target attribute of the target profile; and
matching a select user of the plurality of users with the target profile based on the correlating of the plurality of the respective user attribute for each of the plurality of users and the target attribute of the target profile and based on the plurality of filter values to incorporate the target attribute into the team profile to improve game performance of the team.

9. The apparatus of claim 8, wherein the respective user attribute for each of the plurality of users is determined by ignoring a game action occurring in a gaming application in response to the stimulation of the electronic gaming accessory.

10. The apparatus of claim 8, wherein the target profile is a select team-member profile a plurality of team-member profiles, each team-member profile of the plurality of team-member profiles having a respective role identity and a corresponding role-specific proficiency threshold.

11. The apparatus of claim 10, further comprising assessing whether the respective user attribute for each of the plurality of users exceeds the role-specific proficiency threshold of the respective role identity, and wherein the plurality of filter values comprise user preferences.

12. The apparatus of claim 11, wherein the target profile corresponds to a first gaming application, and wherein the respective user attribute for each of the plurality of users corresponds to a stimulation record of the electronic gaming accessory of the corresponding user of the plurality of users in relation to a second gaming application.

13. The apparatus of claim 10, further comprising:
comparing the respective user attribute to a corresponding role-specific proficiency threshold of the target profile; and
identifying the respective user attribute as being indicative of a qualified team-member candidate responsive to the comparing of the respective user attribute indicating that the respective user attribute satisfies the corresponding role-specific proficiency threshold.

14. The apparatus of claim 13, further comprising:
determining a respective supplemental user attribute characterizing an aspect of a user; and
filtering the qualified team-member candidate responsive to the supplemental user attribute.

15. A non-transitory machine-readable storage medium for use in a social gaming network, comprising executable instructions, which, responsive to being executed by a processing system including a processor, cause the processing system to perform operations comprising:
detecting a plurality of stimulation signals based on stimulation of an electronic gaming accessory of a user;
determining a proficiency attribute of a first user based on the plurality of stimulation signals of the electronic gaming accessory of the first user responsive to game-related activity in an electronic game application, wherein the proficiency attribute is lacking in a team profile, wherein the team profile is associated with a team comprising of a plurality of team members playing a video game on the social gaming network, and wherein the plurality of team members are at a plurality of geographic locations;
receiving a preference of the first user;
updating a first user record responsive to the receiving of the proficiency attribute of the first user and the receiving of the preference, resulting in an updated first user record; and
forwarding the updated first user record to a matching service, wherein the matching service matches the first user and a second user based on the proficiency attribute and the preference of the updated first user record, wherein the second user is one of the plurality of team members, and wherein the proficiency attribute is incorporated into the team profile to improve game performance of the team.

16. The non-transitory machine-readable storage medium of claim 15, wherein the proficiency attribute is based on the plurality of stimulation signals of the electronic gaming accessory, modified by a game action result of the electronic game application responsive to the stimulation of the electronic gaming accessory.

17. The non-transitory machine-readable storage medium of claim 15, wherein the proficiency attribute is based on a statistic determined from the plurality of stimulation signals of the electronic gaming accessory.

18. The non-transitory machine-readable storage medium of claim 15, wherein the operations further comprise:
- receiving the team profile comprising a plurality of team-member profiles, each team-member profile of the plurality of team-member profiles having a respective role identity and a corresponding role-specific proficiency threshold; and
- assessing from the updated first user record, a suitability of the first user to participate as a team-member characterized by a team-member profile of the plurality of team-member profiles.

19. The non-transitory machine-readable storage medium of claim 18, wherein the team-member profile of the plurality of team-member profiles corresponds to a second gaming application, and wherein the proficiency attribute of the first user corresponds to a stimulation signal of the plurality of stimulation signals of the electronic gaming accessory in relation to a first gaming application.

20. The non-transitory machine-readable storage medium of claim 18, wherein the operations further comprise:
- comparing the updated first user record to the corresponding role-specific proficiency threshold of the team-member profile of the plurality of team-member profiles; and
- identifying the updated first user record as being indicative of a qualified team-member candidate responsive to the comparing of the updated first user record to the corresponding role-specific proficiency threshold.

\* \* \* \* \*